US011031896B2

(12) United States Patent
Hatakeyama et al.

(10) Patent No.: US 11,031,896 B2
(45) Date of Patent: Jun. 8, 2021

(54) MOTOR DRIVING APPARATUS AND REFRIGERATION CYCLE EQUIPMENT

(71) Applicant: Mitsubishi Electric Corporation, Tokyo (JP)

(72) Inventors: Kazunori Hatakeyama, Tokyo (JP); Keiichiro Shizu, Tokyo (JP); Mitsuo Kashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/613,150

(22) PCT Filed: Jul. 31, 2017

(86) PCT No.: PCT/JP2017/027673
§ 371 (c)(1),
(2) Date: Nov. 13, 2019

(87) PCT Pub. No.: WO2019/026125
PCT Pub. Date: Feb. 7, 2019

(65) Prior Publication Data
US 2020/0403547 A1    Dec. 24, 2020

(51) Int. Cl.
*H02P 25/18*     (2006.01)
*H02P 29/024*    (2016.01)

(52) U.S. Cl.
CPC ............ *H02P 25/18* (2013.01); *H02P 29/024* (2013.01)

(58) Field of Classification Search
CPC ................................ H02P 25/18; H02P 29/024

USPC ............................................ 318/400.01, 700
See application file for complete search history.

(56) References Cited

U.S. PATENT DOCUMENTS 5,488,279 A    1/1996   Kawamoto et al.
5,723,967 A *  3/1998   Hongo ...................... H02P 6/21
                                                318/400.11

FOREIGN PATENT DOCUMENTS

EP    0 528 102 A2    2/1993
JP    S64-074081 A    3/1989
JP    2000-188897 A   7/2000
JP    2008-228513 A   9/2008

OTHER PUBLICATIONS

Extended European Search Report dated Apr. 3, 2020 in corresponding EP application No. 17920238.7.

* cited by examiner

*Primary Examiner* — David Luo
(74) *Attorney, Agent, or Firm* — Posz Law Group, PLC

(57) ABSTRACT

An electric quantity of a power supply of a connection switching device for switching the connection state of a motor, or at least one electric quantity which varies with the first-mentioned electric quantity is detected, the result of the detection is used to detect or predict a fall of a voltage of the switching power supply. Based on the result of the detection or prediction, an inverter is so controlled as to stop the motor before the voltage of the switching power supply falls below the minimum voltage required for the operation of the connection switching device. Breakdown of the connection switching device can be prevented.

12 Claims, 19 Drawing Sheets

MOTOR DRIVING APPARATUS AND REFRIGERATION CYCLE EQUIPMENT

CROSS REFERENCE TO RELATED APPLICATION

This application is a U.S. national stage application of International Patent Application No. PCT/JP2017/027673 filed on Jul. 31, 2017, the disclosure of which is incorporated herein by reference.

TECHNICAL FIELD

The present invention relates to a motor driving apparatus, and refrigeration cycle equipment provided therewith.

BACKGROUND

A motor driving apparatus has been known which is provided with a connection switching device for switching stator windings of a motor between a plurality of different connection states, an inverter for driving the motor, and a controller for controlling the inverter, and in which the controller stops the inverter upon detection of an abnormal voltage such as an overvoltage or undervoltage, on DC bus lines (e.g., Patent Reference 1).

Also a magnetic levitation rotating machine has been known which is provided with an inverter driving an AC motor having a rotor supported by a magnetic bearing, and performing regenerative operation of the AC motor at the time of power failure, and with which regenerative power generated by the regenerative operation at the time of power failure is supplied via DC bus lines to a magnetic bearing driving apparatus, so as to continue the support of the rotor by means of the magnetic bearing until the rotor is decelerated to or below a safe speed, thereby to avoid contact of the rotor rotating at a high speed with a fixed part (e.g., Patent Reference 2).

PATENT REFERENCES

Patent Reference 1: Japanese Patent Publication No. 2008-228513
Patent Reference 2: Japanese Patent Publication No. H1-74081

In the technology described in Patent reference 1, the connection switching device formed of electromagnetic switches which mechanically make or break contacts by electromagnetic action is sometimes used. The electromagnetic switches return to a certain connection state when the power supply is lost. When the AC power supply is lost, due for example to power failure, the power supply for driving the electromagnetic switches is also lost, with the result that the connection state of the electromagnetic switches may be switched. If the electromagnetic switches are switched before the inverter for driving the motor is stopped, arc discharge may occur between the contacts, which may result in contact welding, and breakdown.

In the technology described in Patent reference 2, in a state in which regenerative current is flowing from the AC motor to the DC bus lines, other devices may cease to operate due to power failure, with the result that safe stopping of the devices cannot be achieved.

Description has been made with respect to a case in which the connection switching device is formed of electromagnetic switches. There are similar problems with semiconductor switches. That is, semiconductor switches may be damaged due to a surge voltage when switching between on and off states occur in a state in which a large current is flowing.

SUMMARY

The present invention has been made in view of the above, and its object is to provide a motor driving apparatus which has a connection switching device for switching the connection state of windings of a motor, in which the connection switching device can be protected even when a switching power supply voltage falls due for example to power failure, and which therefore has a high reliability.

A motor driving apparatus according to the present invention comprises:
a connection switching device to switch a connection state of a motor having windings, whose connection can be switched;
a control power supply generating circuit to provide a switching power supply to the connection switching device;
an inverter to apply an AC voltage of a variable frequency and a variable voltage value to the motor;
a control device to control the inverter and the connection switching device; and
an electric quantity detector to detect an electric quantity of the switching power supply, or at least one electric quantity which varies with the first-mentioned electric quantity;
wherein, before a fall of a voltage of the switching power supply below a minimum voltage required for operation of the connection switching device, the motor is stopped.

According to the present invention, the inverter is so controlled that the motor is stopped before the voltage of the switching power supply falls below the minimum voltage required for the operation of the connection switching device, so that breakdown of the connection switching device can be prevented. Accordingly, the lifetime of the motor driving apparatus can be lengthened. From another viewpoint, the connection switching device can be configured of less expensive parts for realizing a desired durability, so that the cost of the motor driving apparatus can be reduced.

DETAILED DESCRIPTION

Description will now be made on a motor driving apparatus according to embodiments of the present invention, and refrigeration cycle equipment provided therewith, with reference to the attached drawings. The following embodiments do not impose limitations on the present invention.

An example of the refrigeration cycle equipment is an air conditioner. In the following embodiments, the present invention is applied to a driving apparatus of a motor driving a compressor of an air conditioner.

First, a refrigeration cycle in an example of an air conditioner will be described with reference to FIG. 1.

Figure 1:
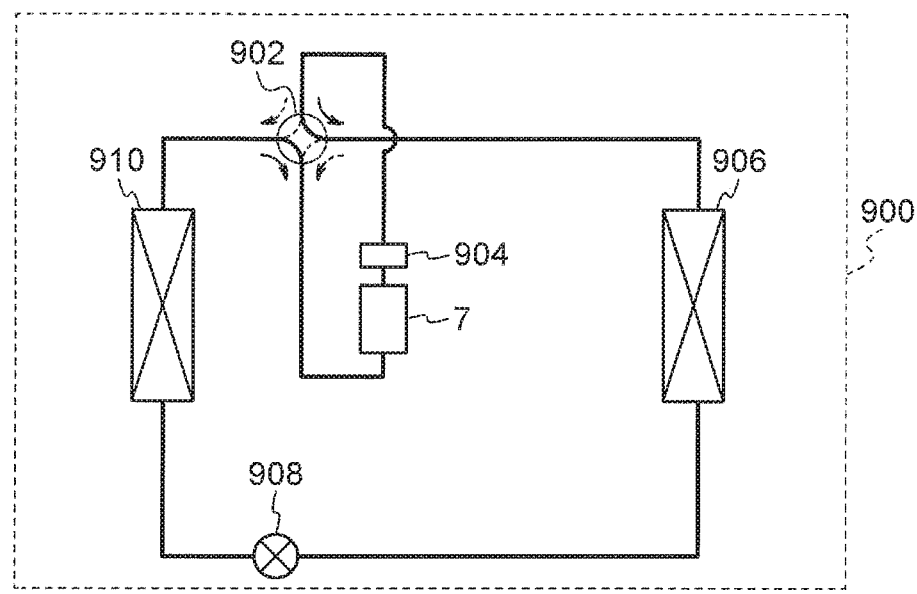
FIG. 1 is a schematic diagram showing an example of a refrigeration cycle of an air conditioner.

A refrigeration cycle 900 in FIG. 1 can perform either heating operation or cooling operation by the switching action of a four-way valve 902.

At the time of heating operation, as shown by solid line arrows, refrigerant is pressurized by and sent out from a compressor 904, is passed through the four-way valve 902, an indoor heat exchanger 906, an expansion valve 908, an outdoor heat exchanger 910, and the four-way valve 902, and is returned to the compressor 904.

At the time of cooling operation, as shown by dashed line arrows, the refrigerant is pressurized by and sent out from the compressor 904, is passed through the four-way valve 902, the outdoor heat exchanger 910, the expansion valve 908, the indoor heat exchanger 906, and the four way valve 902, and is returned to the compressor 904.

At the time of the heating operation, the indoor heat exchanger 906 functions as a condenser to dissipate heat, and the outdoor heat exchanger 910 functions as an evaporator to absorb heat. At the time of the cooling operation, the outdoor heat exchanger 910 functions as a condenser to dissipate heat, and the indoor heat exchanger 906 functions as an evaporator to absorb heat. The expansion valve 908 expands the refrigerant by reducing the pressure.

The compressor 904 is driven by a variable speed-controlled motor 7.

First Embodiment

Figure 2:
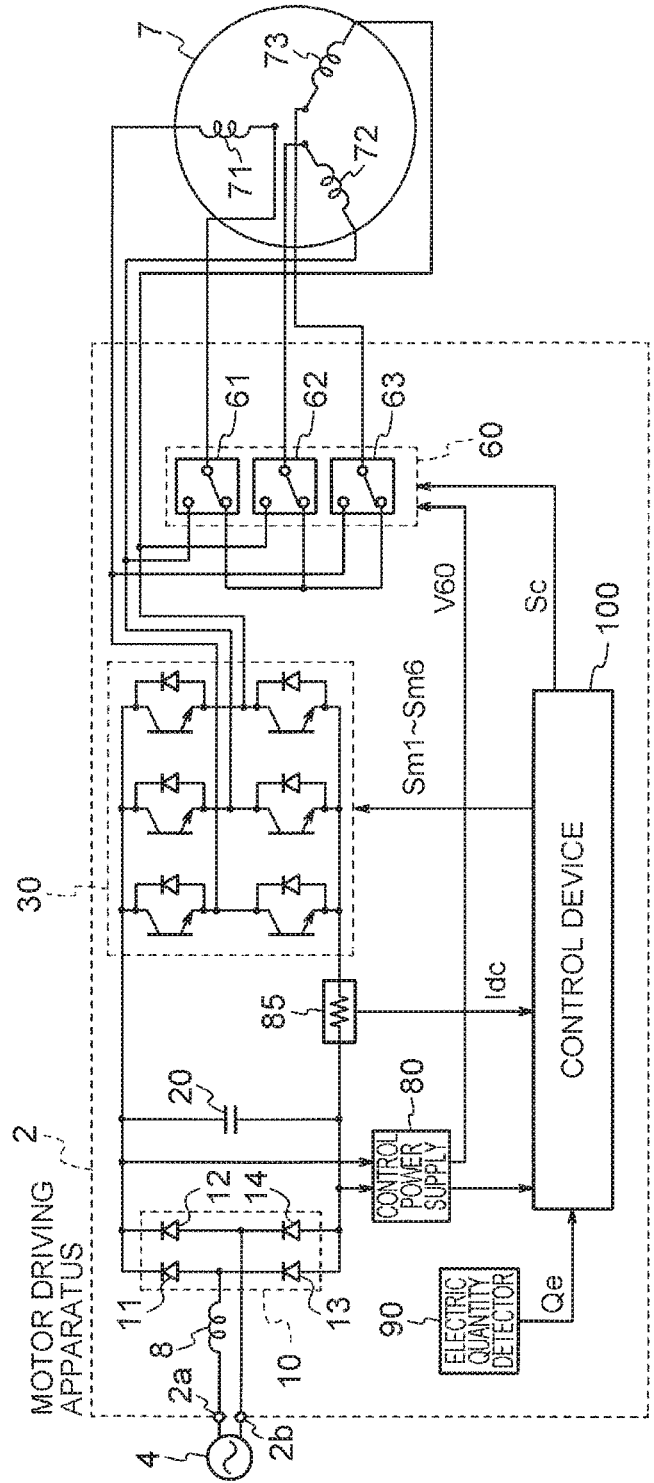
FIG. 2 is a diagram showing a motor driving apparatus of a first embodiment of the present invention.

FIG. 2 is a schematic wiring diagram showing a motor driving apparatus 2 of a first embodiment of the present invention, together with the motor 7.

The illustrated motor driving apparatus 2 is for driving the motor 7, and includes AC power supply input terminals 2a, 2b, a reactor 8, a rectifying circuit 10, a capacitor 20, an inverter 30, a connection switching device 60, a control power supply generating circuit 80, a bus line current detector 85, an electric quantity detector 90, and a control device 100.

The control device 100 may be formed, for example, of a microcomputer including a CPU (Central Processing Unit), a DSP (Digital Signal Processor), or the like, or dedicated hardware. In the following description, it is assumed that the control device is formed of a microcomputer.

The AC power supply input terminals 2a, 2b are connected an external AC power supply 4, and an AC voltage from the AC power supply 4 is applied to the AC power supply input terminals 2a, 2b. The applied voltage has an amplitude (effective value) of 100V, 200V or the like, and has a frequency of 50 Hz, 60 Hz or the like.

The rectifying circuit 10 receives the AC power from the AC power supply 4 via the input terminals 2a, 2b and the reactor 8, and rectifies the AC power. The rectifying circuit 10 is a full-wave rectifying circuit formed by bridge-connection of rectifying elements 11 to 14 such as diodes.

The capacitor 20 smoothes a DC voltage obtained by rectification by the rectifying circuit 10 to output a DC voltage V20.

Figure 3:
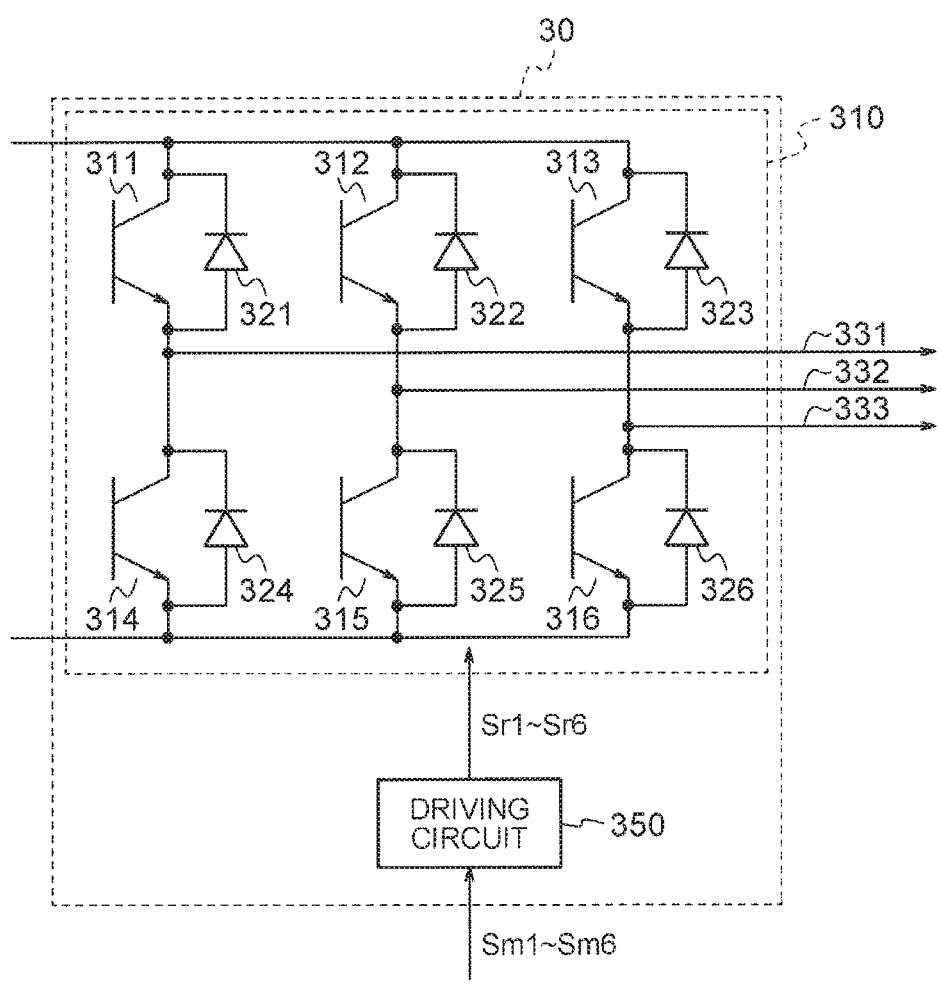
FIG. 3 is a diagram showing the configuration of an inverter in FIG. 2.

The inverter 30 includes an inverter main circuit 310 and a driving circuit 350, as shown in FIG. 3, and input terminals of the inverter main circuit 310 are connected to electrodes of the capacitor 20.

Lines connecting the outputs of the rectifying circuit 10, the electrodes of the capacitor 20, and the input terminals of the inverter main circuit 310 are called DC bus lines.

The inverter 30 is controlled by the control device 100 such that switching elements 311 to 316 of six arms of the inverter main circuit 310 perform on-off operation, to generate a three-phase AC voltage of a variable frequency and a variable voltage value and supply the AC voltage to the motor 7. Free-wheeling rectifying elements 321 to 326 are connected in parallel with the switching elements 311 to 316.

The motor 7 is a three-phase permanent magnet synchronous motor, and ends of stator windings are drawn out to the exterior of the motor 7, to enable switching to either of a star connection (Y connection) and a delta connection (Δ connection). The switching is performed by the connection switching device 60.

Figure 4:
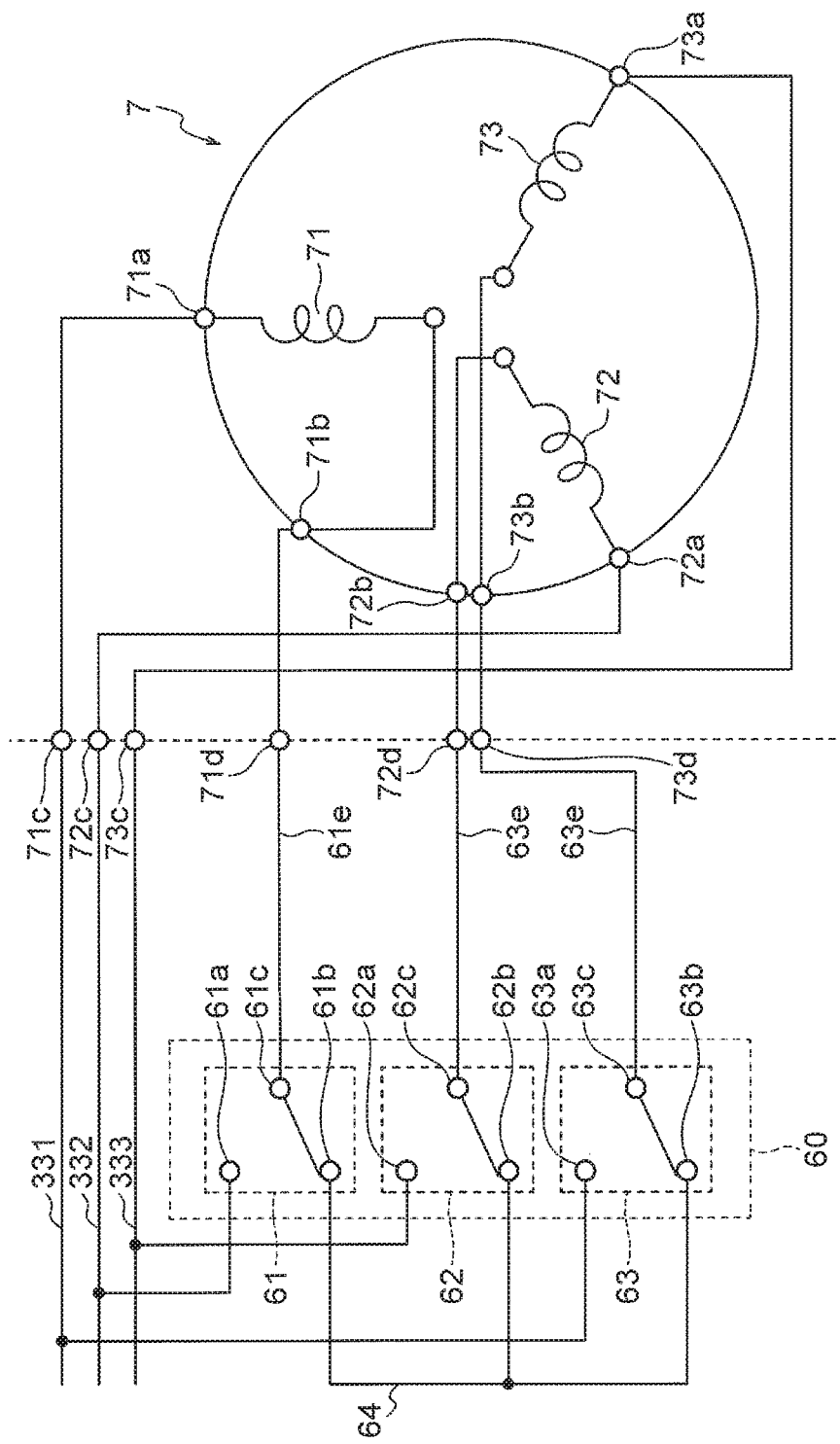
FIG. 4 is a wiring diagram showing details of windings of a motor in FIG. 1, and a connection switching device.

FIG. 4 shows the stator windings of the motor 7 and the connection switching device 60 in further detail.

As illustrated, first ends 71a, 72a, 73a of the three-phase windings 71, 72, 73 of the U, V and W phases of the motor 7 are respectively connected to external terminals 71c, 72c, 73c, and second ends 71b, 72b, 73b of the windings 71, 72, 73 of the U, V and W phases are respectively connected to external terminals 71d, 72d, 73d, to enable connection of the motor 7 with the exterior thereof. U, V and W phase output lines 331, 332, 333 of the inverter 30 are connected to the external terminals 71c, 72c, 73c.

Figure 5:
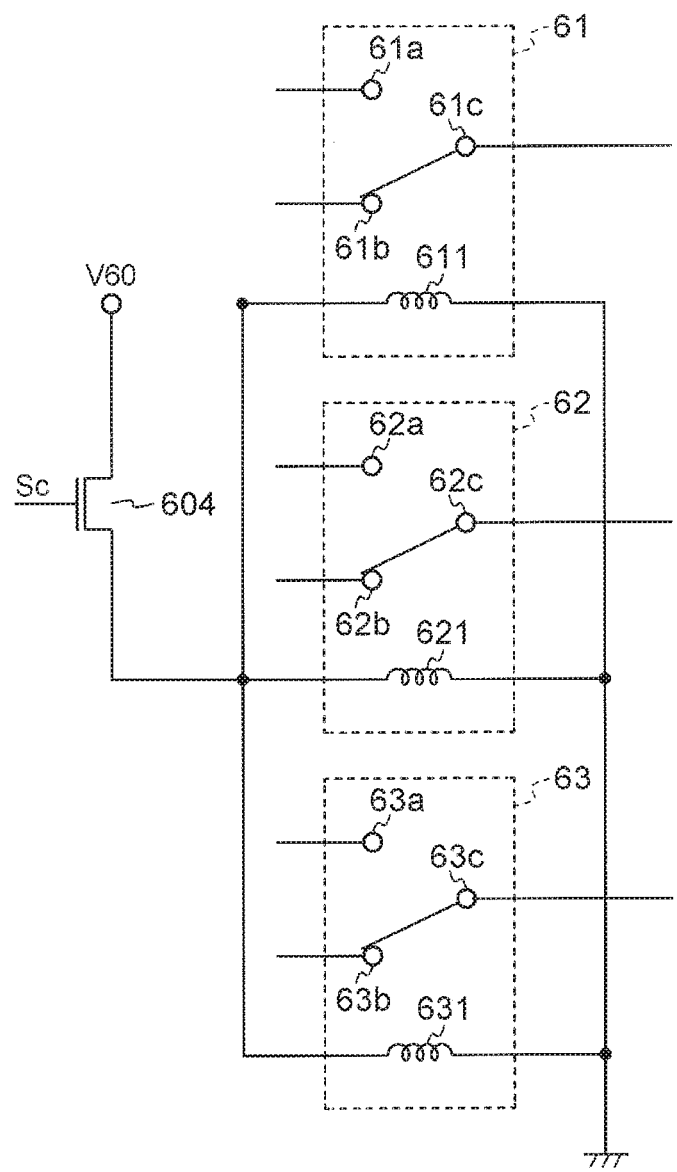
FIG. 5 is a wiring diagram showing details of selectors of the connection switching device in FIG. 2.

In the illustrated example, the connection switching device 60 includes selectors 61, 62, 63. As the selectors 61, 62, 63, electromagnetic switches in which contacts are opened and closed electromagnetically are used. Such electromagnetic switches include what are called relays, contactors, or the like, and are formed, for example, as shown in FIG. 5, and assume different connection states between when a current is flowing through excitation coils 611, 621, 631, and when no current is flowing through the excitation coils 611, 621, 631.

The excitation coils 611, 621, 631 are so connected to receive a switching power supply voltage V60, which will be described later, via a semiconductor switch 604. The on-off of the semiconductor switch 604 is controlled by a switching control signal Sc output from the control device 100.

A common contact 61c of the selector 61 is connected via a lead line 61e to the terminal 71d, a normally-closed contact 61b is connected to a neutral point node 64, and a normally-open contact 61a is connected to the V-phase output line 332 of the inverter 30.

A common contact 62c of the selector 62 is connected via a lead line 62e to the terminal 72d, a normally-closed contact 62b is connected to the neutral point node 64, and a normally-open contact 62a is connected to the W-phase output line 333 of the inverter 30.

A common contact 63c of the selector 63 is connected via a lead line 63e to the terminal 73d, a normally-closed contact 63b is connected to the neutral point node 64, and a normally-open contact 63a is connected the U-phase output line 331 of the inverter 30.

When no current is flowing through the excitation coils 611, 621, 631, the selectors 61, 62, 63 are in a state illustrated, in which they are switched to the normally-closed contact side, that is, the common contacts 61c, 62c, 63c are connected to the normally-closed contacts 61b, 62b, 63b. In this state, the motor 7 is in the Y connection state.

When a current is flowing through the excitation coils 611, 621, 631, the selectors 61, 62, 63 are in a state, opposite to that illustrated, in which they are switched to the normally-open contact side, that is, the common contacts 61c, 62c, 63c are connected to the normally-open contacts 61a, 62a, 63a. In this state, the motor 7 is in the Δ connection state.

Advantages of using, as the motor 7, one capable of being switched to either of Y connection and Δ connection will now be described with reference to FIGS. 6(a) and 6(b).

Figure 6A:
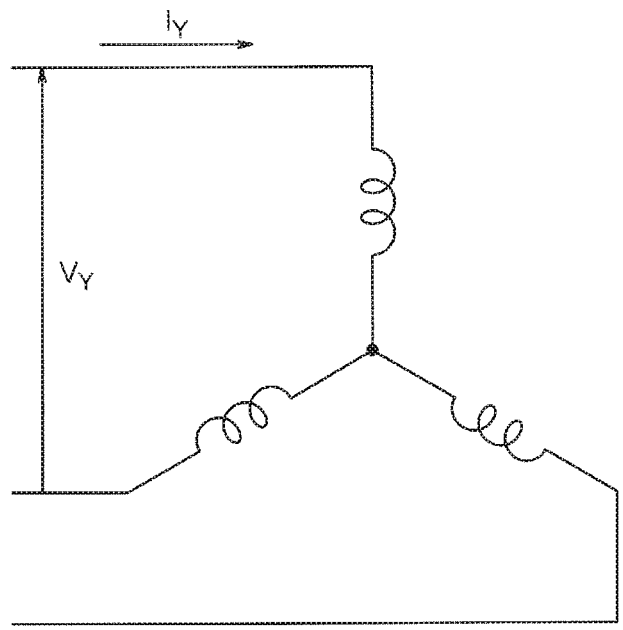
FIG. 6(a) and FIG. 6(b) are diagrams schematically illustrating the windings of the motor in different connection states.
Figure 6B:
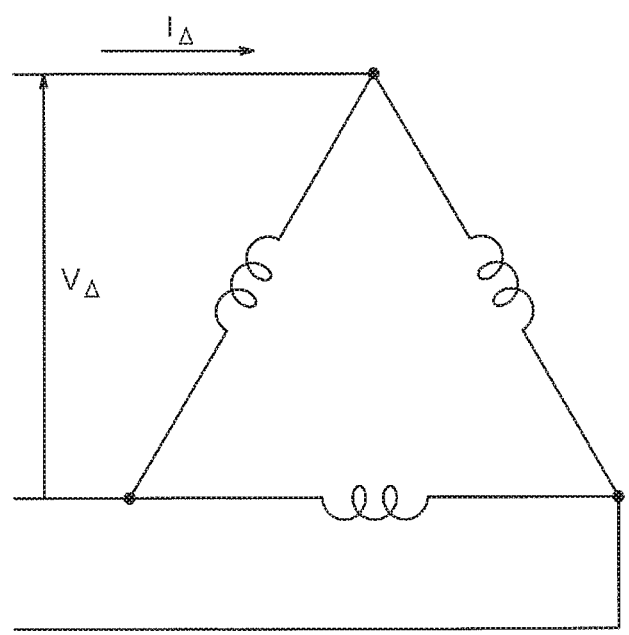

FIG. 6(a) schematically shows a state of connection of the stator windings at the time of Y connection, whereas FIG. 6(b) schematically shows a state of connection of the stator windings at the time of Δ connection.

If the line voltage and the flow-in current at the time of Y connection are respectively denoted by VY and IY, the line voltage and the flow-in current at the time of Δ connection are respectively denoted by VΔ and IΔ, and if it is assumed that the voltage applied to the winding of each phase is equal, then there is a relation:

$$VΔ = VY/\sqrt{3} \qquad (1)$$

and there is a relation:

$$IΔ = \sqrt{3} \times IY \qquad (2)$$

When the voltage VY and the current IY at the time of Y connection, and the voltage VΔ and the current IΔ at the time of Δ connection have relations of the equations (1) and (2), the power supplied to the motor is equal between the Y connection and the Δ connection.

In other words, when the power supplied to the motor is equal, the current is larger and the voltage required for driving is lower at the time of the Δ connection.

Utilizing the above-described nature, it can be conceived to select the connection state depending on the load condition and the like. For example, it can be conceived to operate at a low speed with Y connection at the time of low load, and to operate at a high speed with Δ connection at the time of high load. By such arrangement, the efficiency at the time of low load is increased, while enabling output of high power at the time of high load.

Further details in this respect are given in connection with a case of a motor for driving a compressor of an air conditioner.

As the motor 7 for driving a compressor of an air conditioner, a synchronous motor using permanent magnets in a rotor is widely used in order to meet the requirements of energy consumption reduction. Also, in the air conditioners of recent years, when the difference between the room temperature and the set temperature is large, the motor 7 is made to operate at a high speed, so as to quickly bring the room temperature closer to the set temperature, whereas when the room temperature is close to the set temperature, the motor 7 is made to operate at a low speed, so as to maintain the room temperature. Where this scheme is adopted the time in which the motor is made to operate at a low speed occupies a large proportion.

When a synchronous motor is used, increase in the rotational speed leads to increase in the counter electromotive force and increase in the voltage value required for the drive. The counter electromotive force is higher in the Y connection than in the Δ connection, as described above.

It may be conceived to weaken the magnetic force of the permanent magnets or to reduce the number of turns of the stator windings in an attempt to reduce the counter electromotive force at a high speed. However, if such a measure is taken, the current required to produce the same output torque is increased, so that the current flowing through the motor 7 and the inverter 30 is increased, and the efficiency is lowered.

It is thus conceived to switch the connection state depending on the rotational speed. For instance, the Δ connection state is selected when the operation at a high speed is required. By doing so, the voltage required for the drive can be made to be $1/\sqrt{3}$ (compared with the Y connection). Accordingly, it is not necessary to reduce the number of turns of the windings or to use field weakening control.

At the time of low speed operation, the Y connection state is selected, so as to make the current value to be $1/\sqrt{3}$ compared with the Δ connection. Moreover, it becomes possible to design the windings to be suitable for the drive at a low speed in the Y connection state. This makes it possible to reduce the current compared with the case in which the Y connection is used throughout the entire speed range. As a result, the loss at the inverter 30 can be reduced, and the efficiency can be increased.

As has been explained, it is advantageous to switch the connection state depending on the load condition, and the reason why the connection switching device is provided is to enable such switching.

The control power supply generating circuit 80 receives and steps down the voltage between the two electrodes of the capacitor 20, i.e., the bus line voltage V20, to generate a control power supply and a switching power supply, provides the control power supply to the control device 100, and provides the switching power supply to the connection switching device 60. For example, the control power supply voltage is 5V, and the switching power supply voltage is 12V. The switching power supply is a power supply for operating the connection switching device 60 for switching the connection state of the motor 7, and provides, in the illustrated example, currents flowing through the above-mentioned excitation coils 611, 621, 631.

The bus line current detector 85 detects the bus line current, i.e., the input current Idc of the inverter 30. The bus line current detector 85 includes a shunt resistor inserted in a bus line, and supplies an analog signal indicating the result of detection, to the control device 100. This signal (detection signal) is converted to a digital signal by an A/D converter, not shown, in the control device 100, and is used for the processes within the control device 100.

The electric quantity detector 90 detects at least one electric quantity Qe in at least one part in the motor driving apparatus 2. The electric quantity referred herein means a voltage, a current or power.

As mentioned above, the control device 100 controls the switching of the connection state by means of the connection switching device 60, and also controls the operation of the inverter 30. For controlling the inverter 30, the control device 100 generates PWM signals Sm1 to Sm6, and supplies them to the inverter 30.

As mentioned above, the inverter 30 includes, not only with the inverter main circuit 310, but also the driving circuit 350, which generates drive signals Sr1 to Sr6 based on the PWM signals, and performs on-off control over the switching elements 311 to 316 using the drive signals Sr1 to Sr6, such that the three-phase AC voltage of a variable frequency and a variable voltage value is applied to the motor 7.

The PWM signals Sm1 to Sm6 are of a magnitude (0 to 5V) of a signal level in a logic circuit, whereas the drive signals Sr1 to Sr6 have a magnitude of a voltage level, e.g., +15V to −15V, required to control the switching elements 311 to 316. Also, the PWM signals Sm1 to Sm6 are produced taking the ground potential of the control device 100 as a reference, whereas the drive signals Sr1 to Sr6 are produced taking the potentials of the negative-side terminals (emitter terminals) of the respectively corresponding switching elements as references.

Also, when the control device 100 detects or predicts a fall of the switching power supply voltage V60 due, for example, to loss of the AC power supply 4, based on the result of detection of the electric quantity Qe by the electric quantity detector 90, the control device 100 performs a braking process (deceleration/stopping process).

Figure 7:
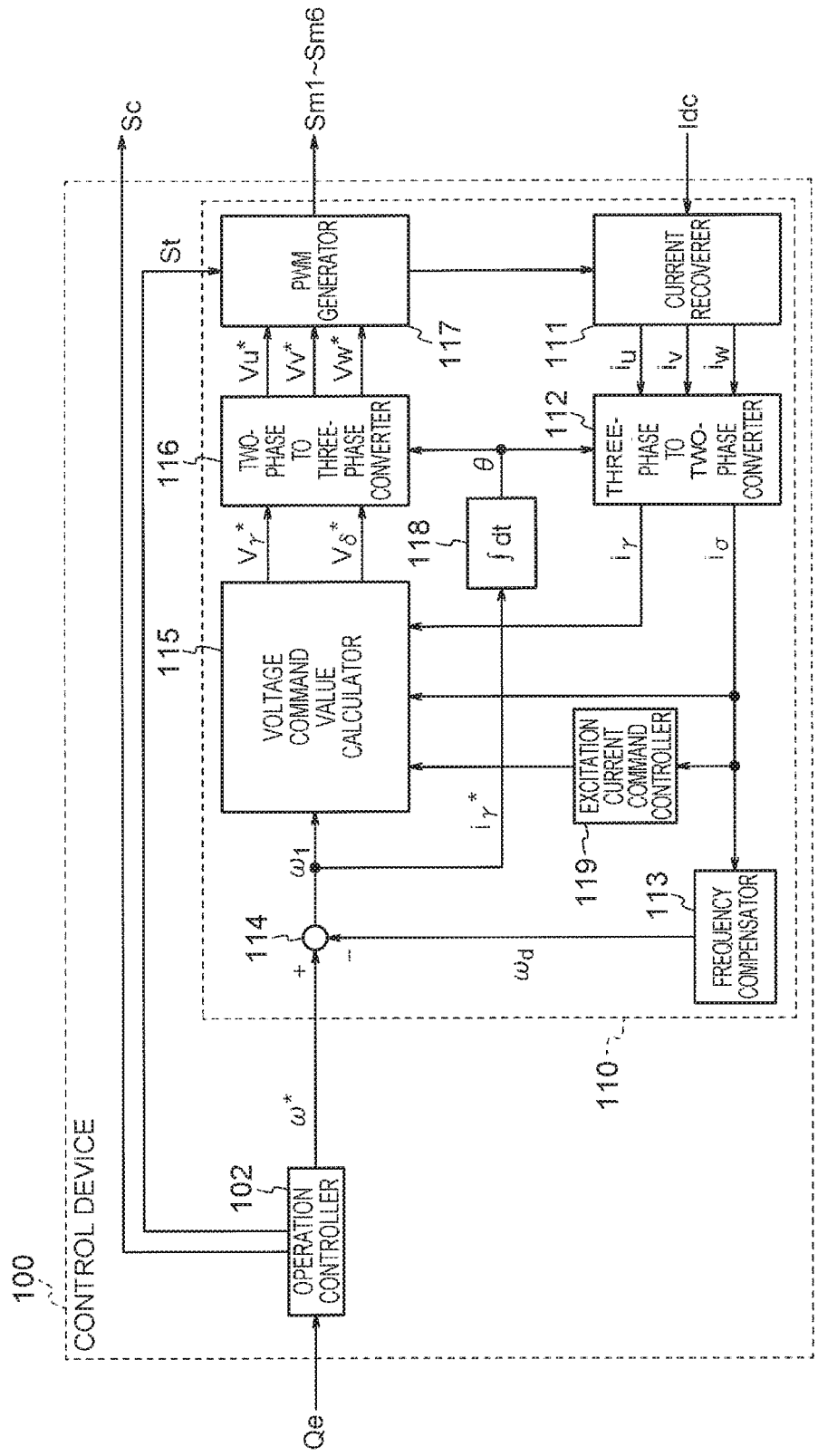
FIG. 7 is a functional block diagram showing an example of a control device used in the first embodiment.

As shown in FIG. 7, the control device 100 includes an operation controller 102 and an inverter controller 110.

The operation controller 102 receives information indicating the room temperature (temperature of the air-conditioned space) detected by a temperature sensor, not shown, receives instructions from control equipment, such as a remote controller, not shown, and controls the operation of the respective parts of the air conditioner. The instructions from the control equipment include information indicating the set temperature, selection of the operation mode, instructions for starting and stopping the operation, and the like.

The operation controller 102 makes a decision on the choice between the Y connection and the Δ connection for the stator windings of the motor 7, and a decision of a target rotational speed, and outputs the switching control signal Sc and a frequency command value ω* based on the decisions. For example, when the difference between the room temperature and the set temperature is large, the operation controller 102 chooses the Δ connection, sets the target rotational speed at a relatively high value, and outputs the frequency command value ω* which, after the starting, gradually increases up to a frequency corresponding to the above-mentioned target rotational speed. When the frequency corresponding to the target rotational speed is reached, the operation controller 102 holds its state, until the room temperature becomes close to the set temperatures.

When the room temperature becomes close to the set temperature, the operation controller 102 causes the motor to be stopped temporarily, causes the switching to the Y connection, and outputs the frequency command value ω* which gradually increases to a frequency corresponding to a relatively low target rotational speed. When the frequency corresponding to the target rotational speed is reached, the operation controller 102 performs control to maintain the state in which the room temperature is close to the set temperature. This control includes adjustment of the frequency, the stopping and restarting of the motor, and the like.

The operation controller 102 also receives the result of the detection of the electric quantity Qe by the electric quantity detector 90, and performs the process of braking the motor 7 when it detects or predicts a fall of the switching power supply voltage V60 due to the loss of the AC power supply 4 or the like.

In this braking process, when the rotational speed of the motor 7 is relatively low, the operation controller 102 causes the motor 7 to be stopped promptly, whereas when the rotational speed of the motor 7 is relatively high, the operation controller 102 causes the rotational speed to decrease gradually, before causing the motor 7 to be stopped.

The process of decreasing the rotational speed of the motor 7 is performed by gradually decreasing the frequency command value ω*. The process of stopping the motor 7 is performed by supplying a signal (stop signal) St for stopping the inverter 30 to the inverter controller 110.

The inverter controller 110 includes a current recoverer 111, a three-phase to two-phase converter 112, a frequency compensator 113, a primary frequency calculator 114, a voltage command value calculator 115, a two-phase to three-phase converter 116, a PWM generator 117, an electrical angle phase calculator 118, and an excitation current command controller 119.

The current recoverer 111 recovers phase currents iu, iv, iw flowing through the motor 7 based on the current value Idc detected by the bus line current detector 85. The current recoverer 111 recovers the phase currents by sampling the DC current Idc detected by the bus line current detector 85, at timings determined based on the PWM signals supplied from the PWM generator 117.

The three-phase to two-phase converter 112 converts the current values iu, iv, iw recovered by the current recoverer 111, to current values on the γ-δ axes represented by an excitation current component (γ axis current) iγ and a torque current component (δ axis current) iδ, using the electrical angle phase θ generated by the electrical angle phase calculator 118 which will be descried later.

The frequency compensator 113 computes a compensation quantity ωd for the rotational frequency, from the δ axis current obtained by the three-phase to two-phase converter 112.

The primary frequency calculator 114 compensates the frequency command value ω* supplied from the operation controller 102, using the frequency compensation quantity ωd obtained from the frequency compensator 112, to determine the compensated frequency command value ω1. The compensated frequency command value ω1 is used as the primary frequency command value. The compensation using the compensation quantity ωd is made by subtracting the compensation quantity ωd from the frequency command value ω*.

The electrical angle phase calculator 118 integrates the compensated frequency command value ω1 to determine the electrical angle phase θ.

The excitation current command controller 119 determines an excitation current command value iγ* which is optimum, yielding the highest efficiency in driving the motor 7, based on the torque current component (δ axis current) iδ.

In FIG. 7, the torque current component iδ is used to determine the excitation current command value iγ*, but the excitation current component iγ, the frequency command value ω*, or the compensated frequency command value ω1 may be used to determine the excitation current command value iγ*, and yet similar results can be obtained.

The excitation current command controller 119 outputs the excitation current command value iγ* yielding a current phase angle βm (not shown), which causes the output torque to be not smaller than a predetermined value (or to be the maximum), that is, the current to be not larger than a predetermined value (or to be the minimum), based on the torque current component iδ (or the excitation current component iγ, the frequency command value ω*, or the compensated frequency command value ω1).

The voltage command value calculator 115 computes voltage command values Vγ*, Vδ* for driving the motor 7, based on the γ axis current iγ and the δ axis current iδ obtained from the three-phase to two-phase converter 112, the frequency command value ω1 obtained from the primary frequency calculator 114, and the excitation current command value iγ* obtained from the excitation current command controller 119.

The two-phase to three-phase converter 116 converts the γ axis voltage command value Vγ*, and the δ axis voltage command value Vδ* (voltage command values in a two-phase coordinate system) obtained from the voltage command value calculator 115, into output voltage command values (three-phase voltage command values) Vu*, Vv*, Vw* in a three-phase coordinate system, using the electrical angle phase θ obtained from the electrical angle phase calculator 118, and outputs the voltage command values Vu*, Vv*, Vw*.

The PWM generator 117 generates the PWM signals Sm1 to Sm6 based on the three-phase voltage command values Vu*, Vv*, Vw* obtained from the two-phase to three-phase converter 116, and outputs the PWM signals Sm1 to Sm6.

The above-mentioned stop signal St is supplied, for example, to the PWM generator 117, which, upon receipt of the stop signal, promptly terminates the output of the PWM signals Sm1 to Sm6.

The driving circuit 350 generates the drive signals Sr1 to Sr6 based on the PWM signals Sm1 to Sm6.

In the example described above, the phase currents iu, iv, iw are recovered from the DC current Idc at the input side of the inverter 30. Alternatively, current detectors may be provided on the output lines 331, 332, 333 of the inverter 30, and the phase currents may be detected by the detectors. In such a case, the currents detected by the detectors can be used in place of the currents recovered by the current recoverer 111.

Now, description will be made of the operation of the motor driving apparatus 2 at the time of loss of the AC power supply 4 due, for example, to power failure or the like.

Figure 8:
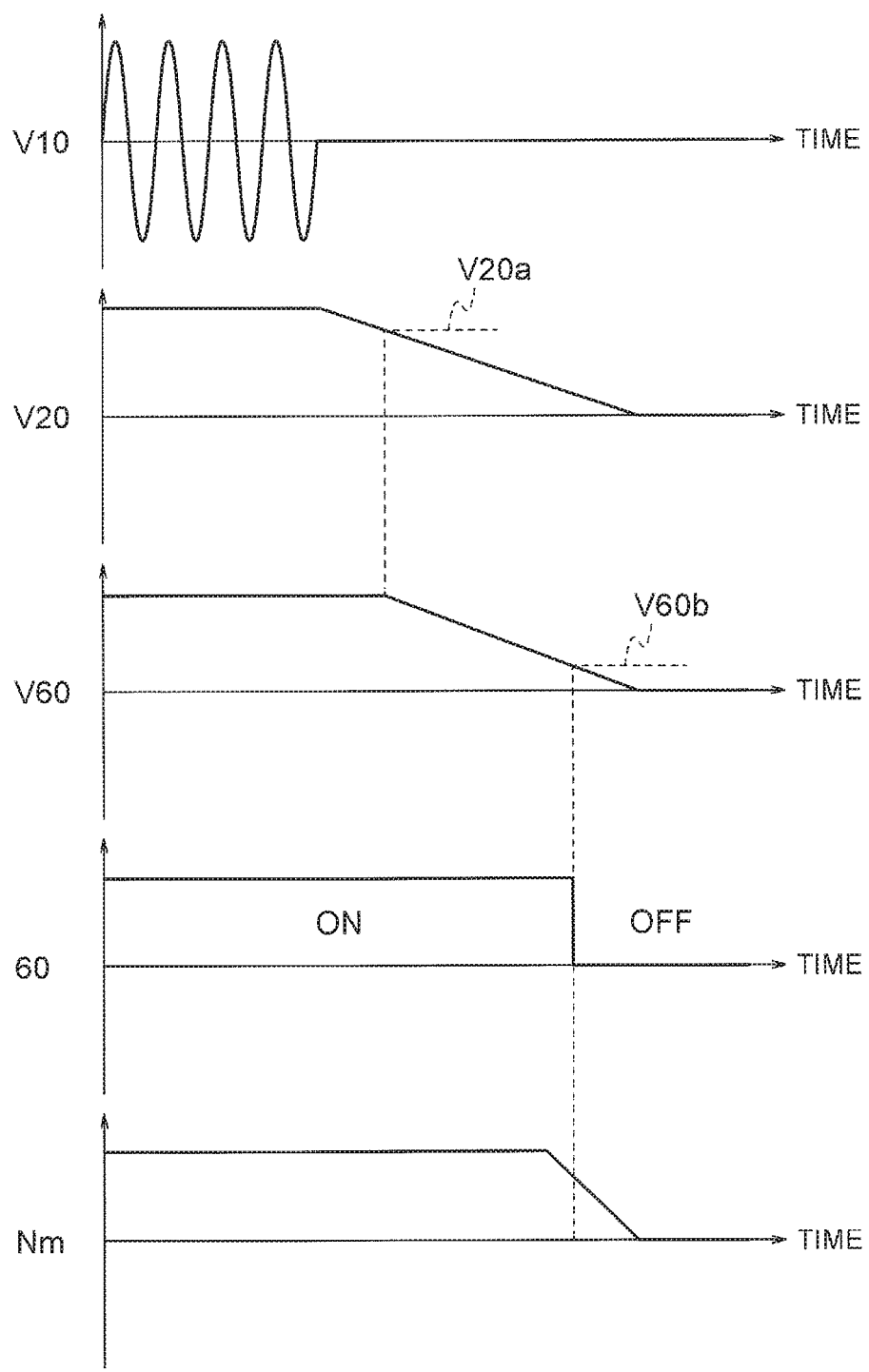
FIG. 8 is a waveform diagram showing the operation of a conventional motor driving apparatus.
Figure 9:
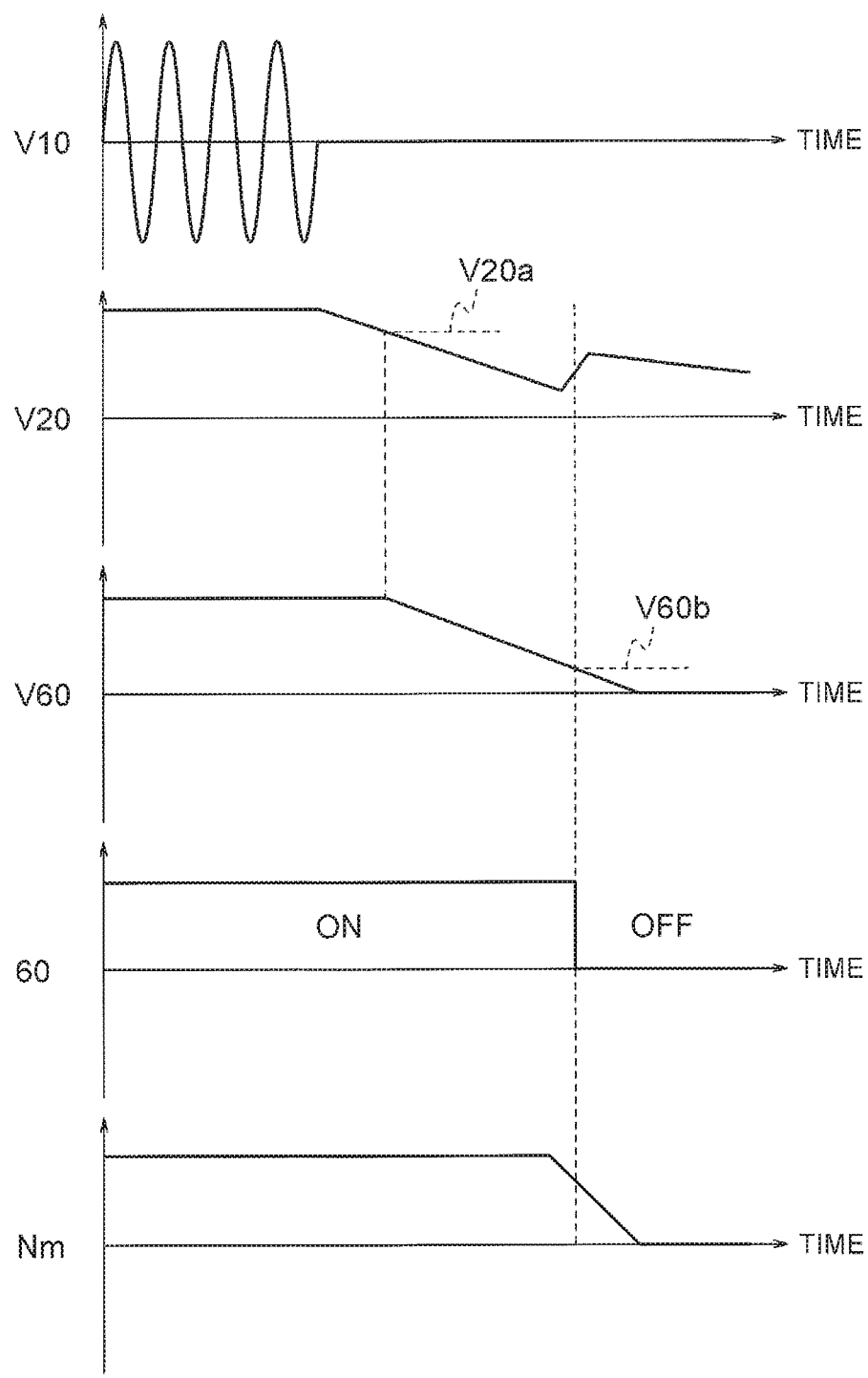
FIG. 9 is a waveform diagram showing the operation of the conventional motor driving apparatus.

First, a problem of the prior art, that is the operation of the motor driving apparatus which does not have the feature of the present invention will be described with reference to FIG. 8 and FIG. 9.

When the AC power supply 4 is lost, due, for example, to power failure, supply of power to the capacitor 20 is terminated. In this state, the inverter 30 continues its operation while consuming the electric charge stored in the capacitor 20.

Due to the consumption of the electric charge, the bus line voltage V20 is gradually lowered. When the bus line voltage V20 falls to be equal to or lower than a certain value, the control power supply generating circuit 80, which operates based on the power supplied from the capacitor 20, ceases to be capable of providing power supply. For example, when the bus line voltage V20 becomes lower than a certain value V20a, the switching power supply voltage V60 begins to fall.

When the switching power supply voltage V60 becomes lower than the smallest voltage (minimum voltage) V60b required for the operation of the connection switching device 60, the connection switching device 60 comes to be in a non-operative state (OFF state), and the selectors 61 to 63 of the connection switching device 60 are connected to the "b" contact sides. That is, if they were in the "b" contact side, they remain so, whereas if they were in the "a" contact side, switching takes place.

The "minimum voltage required for the operation" means the minimum voltage with which it is possible to maintain the connection to the "a" contact side when connection to the "a" contact side is commanded.

If the supply of power from the inverter 30 to the motor 7 is continued and the rotational speed Nm of the motor 7 has not become zero when the switching takes place, arc discharge may occur between the contacts of the selectors 61 to 63, which may result in breakdown such as contact welding.

In order to avoid such a breakdown, it may be conceived to stop the inverter 30 before the switching of the connection switching device 60 takes place, i.e., before the switching power supply voltage V60 falls to the minimum voltage V60b. However, even if the inverter 30 is stopped, the rotational speed Nm is lowered only gradually, as shown in FIG. 9, due to the inertia of the motor 7, and the counter electromotive force corresponding to the rotational speed Nm continues to be generated. If the counter electromotive force is higher than the bus line voltage V20 (i.e., the voltage between the two electrodes of the capacitor 20), it functions as a regenerative voltage, causing a charging current flowing from the motor 7 via the connection switching device 60 and the rectifying elements 321 to 326 to the capacitor 20. FIG. 9 shows a rise of the bus line voltage V20 due to the charging current.

If, in a state in which the charging current is flowing, the switching power supply voltage V60 falls to the minimum voltage V60b, so that the connection switching device 60 cannot maintain the operative state, thereby causing the switching to take place, arc discharge may occur, which may result in breakdown such as contact welding.

Therefore, according to the present invention, it is so controlled that, when the motor is rotating at a high speed, the frequency of the output voltage of the inverter is gradually decreased, to gradually decrease the rotational speed of the motor 7, and, after the counter electromotive force becomes sufficiently low, the switching of the connection switching device 60 takes place. By such arrangement, it is possible to prevent breakdown such as contact welding, and to obtain a motor driving apparatus with a high reliability.

The loss of the power supply can be detected in a variety of methods. In the present embodiment, the loss of the power supply is detected by monitoring the switching power supply.

Figure 10:
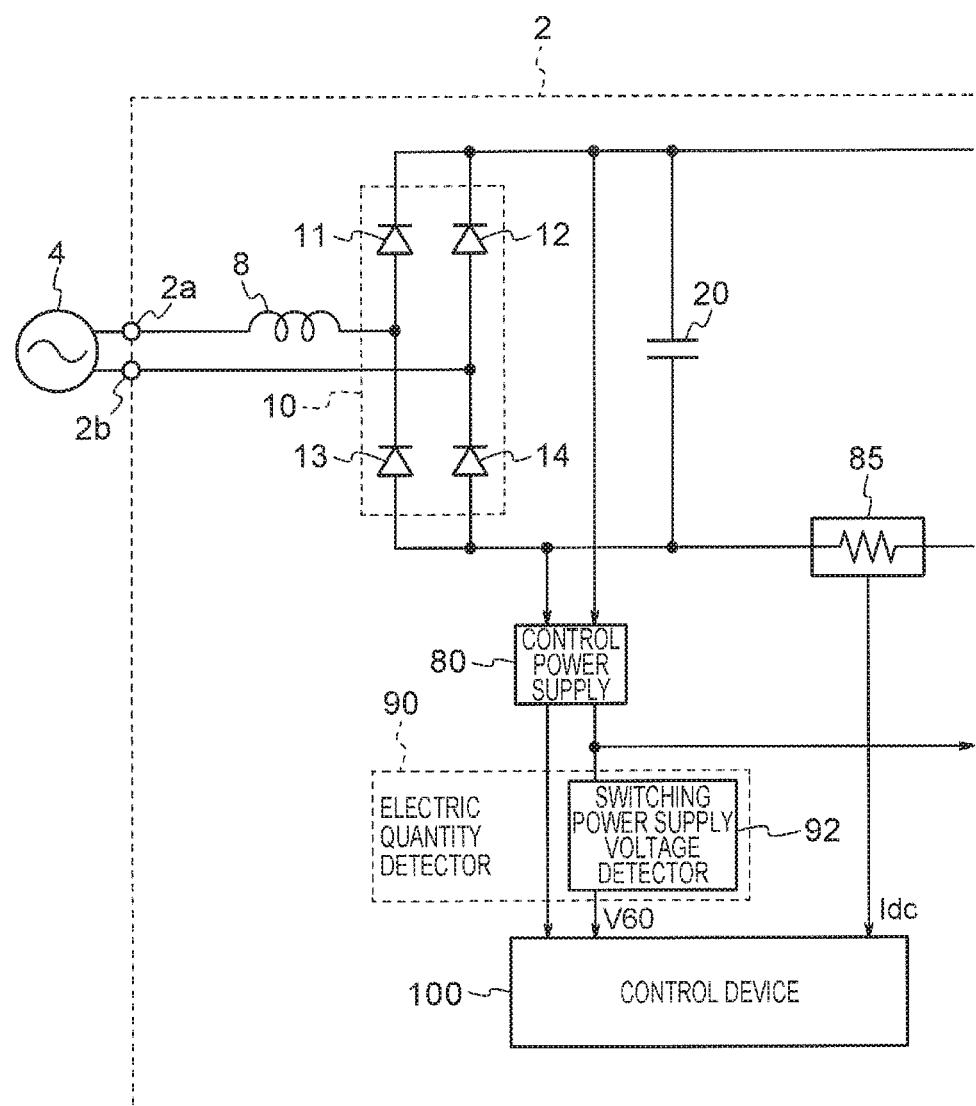
FIG. 10 is a diagram showing an electric quantity detector and parts connected thereto, in the motor driving apparatus of the first embodiment.

In the first embodiment, the electric quantity detector 90 includes, as shown in FIG. 10, a switching power supply voltage detector 92, and monitors the switching power supply by detecting the switching power supply voltage V60 generated by the control power supply generating circuit 80.

The switching power supply voltage detector 92 detects the switching power supply voltage V60, and supplies an analog signal indicating the result of the detection, to the control device 100. For example, the switching power supply voltage detector 92 includes a circuit for dividing the switching power supply voltage V60 by means of series-connected resistors, to produce a voltage, e.g., a voltage not higher than 5V, suitable for processes by a microcomputer in the control device 100, and outputs the converted voltage. This signal (detection signal) is converted into a digital signal by an A/D converter, not shown, in the control device 100, and used for processes within the control device 100.

The operation controller 102 (FIG. 7) determines whether the switching power supply voltage V60 detected by the switching power supply voltage detector 92 is not smaller than a predetermined decision threshold value V60$t$, and, when it determines that the switching power supply voltage V60 is lower than the decision threshold value V60$t$, it performs a process of braking the motor 7 based on the result of the determination.

In the process of braking the motor 7, if the rotational speed Nm of the motor 7 is not higher than a predetermined value Ns, the inverter 30 is stopped promptly, whereas if the rotational speed Nm of the motor 7 is higher than the predetermined value Ns, the rotational speed Nm is gradually decreased, and when it is decreased to the predetermined value Ns, the inverter 30 is stopped.

Figure 11:
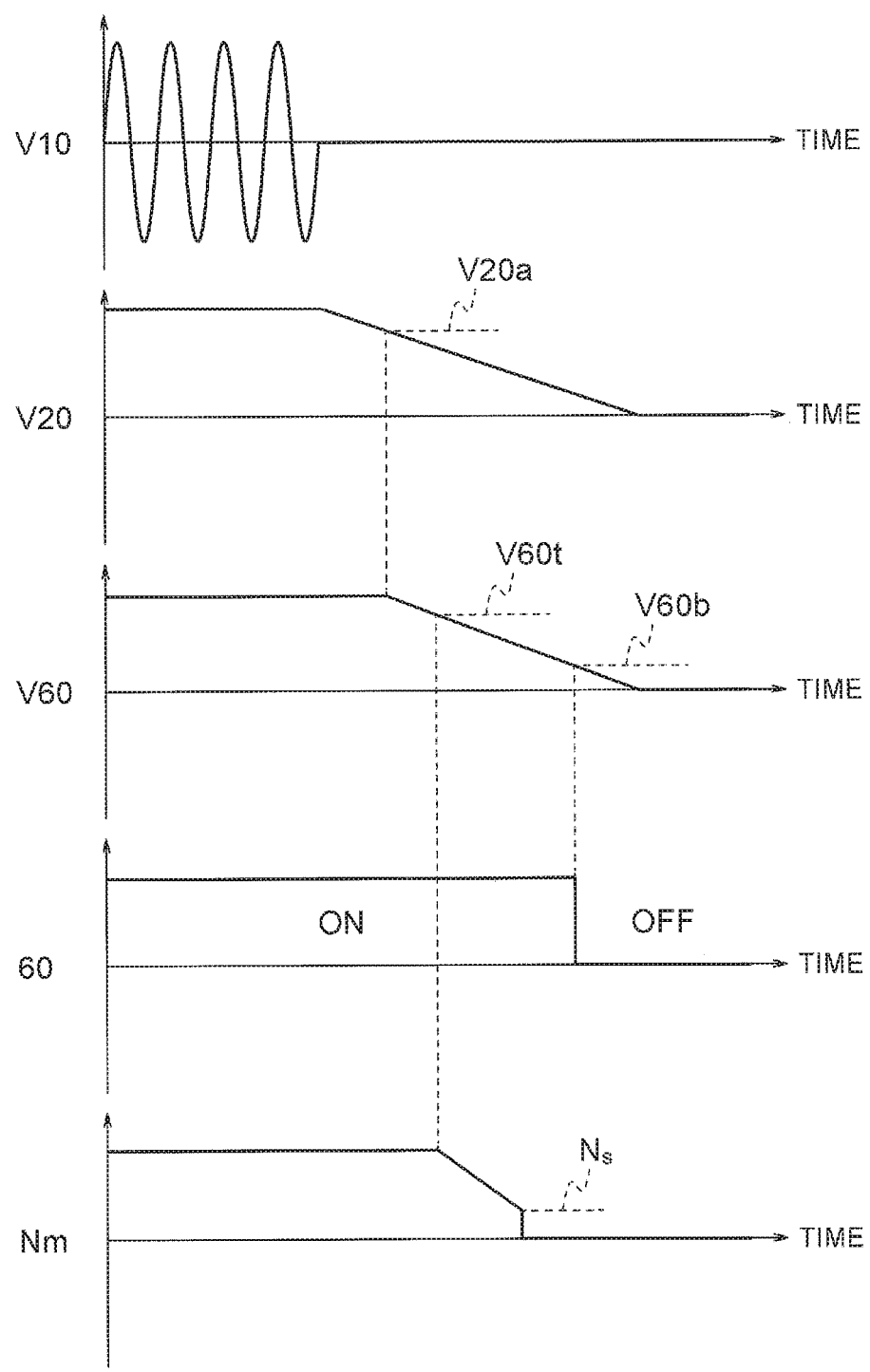
FIG. 11 is a waveform diagram showing the operation of the motor driving apparatus of the first embodiment.

The operation in the first embodiment will now be described with reference to FIG. 11.

That is, in the first embodiment, the operation controller 102 receives the switching power supply voltage V60 detected by the switching power supply voltage detector 92, and repeatedly determines whether the switching power supply voltage V60 is not smaller than the decision threshold value V60$t$, and, when it determines that the switching power supply voltage V60 is lower than the decision threshold value V60$t$, it performs the process of braking the motor 7 based on the result of the determination.

The braking process by the operation controller 102 is performed in the following manner.

If, at the time of starting the process of braking the motor 7, the rotational speed Nm of the motor 7 is not higher than the predetermined value Ns, the inverter 30 is stopped promptly. The rotational speed Nm of the motor 7 can be estimated from the frequency command value $\omega^*$. The process of stopping the inverter 30 is performed by supplying the stop signal St to the inverter controller 110.

If, at the time of starting the process of braking the motor 7, the rotational speed Nm of the motor 7 is higher than the predetermined value Ns, the frequency command value $\omega^*$ is gradually reduced with the elapse of time. By doing so, the frequency command value $\omega 1$ is gradually reduced, and as shown in FIG. 11, the rotational speed Nm of the motor 7 is gradually decreased. When the rotational speed Nm is decreased to the predetermined value Ns, the inverter is stopped.

During the deceleration of the motor 7, counter electromotive force is generated in the motor 7, and if the counter electromotive force is higher than the bus line voltage V20, it functions as a regenerative voltage, causing a charging current to flow into the capacitor 20, retarding the fall of the bus line voltage V20.

The process of reducing the frequency command value $\omega^*$ is so made that the motor 7 can be stopped before the switching power supply voltage V60 falls to the minimum voltage V60$b$.

When the frequency command value $\omega^*$ is reduced, the voltage applied from the inverter 30 to the motor 7 is gradually reduced, so that the currents to the motor 7 and the connection switching device 60 cease to flow.

By decelerating the motor 7, the state in which the counter electromotive force is higher than the bus line voltage V20 does not last long, and is terminated before long.

When the counter electromotive force of the motor 7 becomes lower than the bus line voltage V20, the charging current from the motor 7 to the capacitor 20 ceases to flow.

In this state, even if the switching power supply voltage V60 falls below the minimum voltage V60$b$ and the contacts are switched, no arc discharge occurs.

The fall of the bus line voltage V20 can be retarded by the charging current which is generated when the motor 7 is decelerated by the reduction of the frequency command value $\omega^*$, so that the fall of the switching power supply voltage V60 generated from the bus line voltage V20 can be retarded, and the connection switching device 60 can be maintained in an operable state until the rotational speed of the motor 7 becomes sufficiently low.

Incidentally, it is desirable that the decision threshold value V60$t$ is so set as to be not larger than the smallest value of a range of variation of the switching power supply voltage V60 in a normal state, and also larger than the largest value of a range of variation of the minimum value V60$b$ required for the operation of the connection switching device 60.

In the first embodiment, the switching power supply voltage V60 is detected, so that the connection switching device 60 can be assuredly protected regardless of the source from which the power used for the generation of the switching power supply is supplied (even when the power is supplied from a source other than the capacitor 20), and, moreover, even when the switching power supply voltage V60 falls for a reason other than the loss of the AC power supply 4.

Incidentally, in the first embodiment, the process of braking the motor 7 is performed based on the switching power supply voltage. However, the process of braking the motor 7 may be performed based on the switching power supply current or the switching power supply power. What is essential is that the process of braking the motor 7 is performed based on an electric quantity obtained by monitoring the switching power supply.

Second Embodiment

Now, a second embodiment of the present invention will be described with reference to FIG. 12 and FIG. 13.

The motor driving apparatus 2 of the second embodiment is generally identical to that described with reference to FIG. 2 to FIG. 7 in connection with the first embodiment. The following description is centered on the differences.

Figure 12:
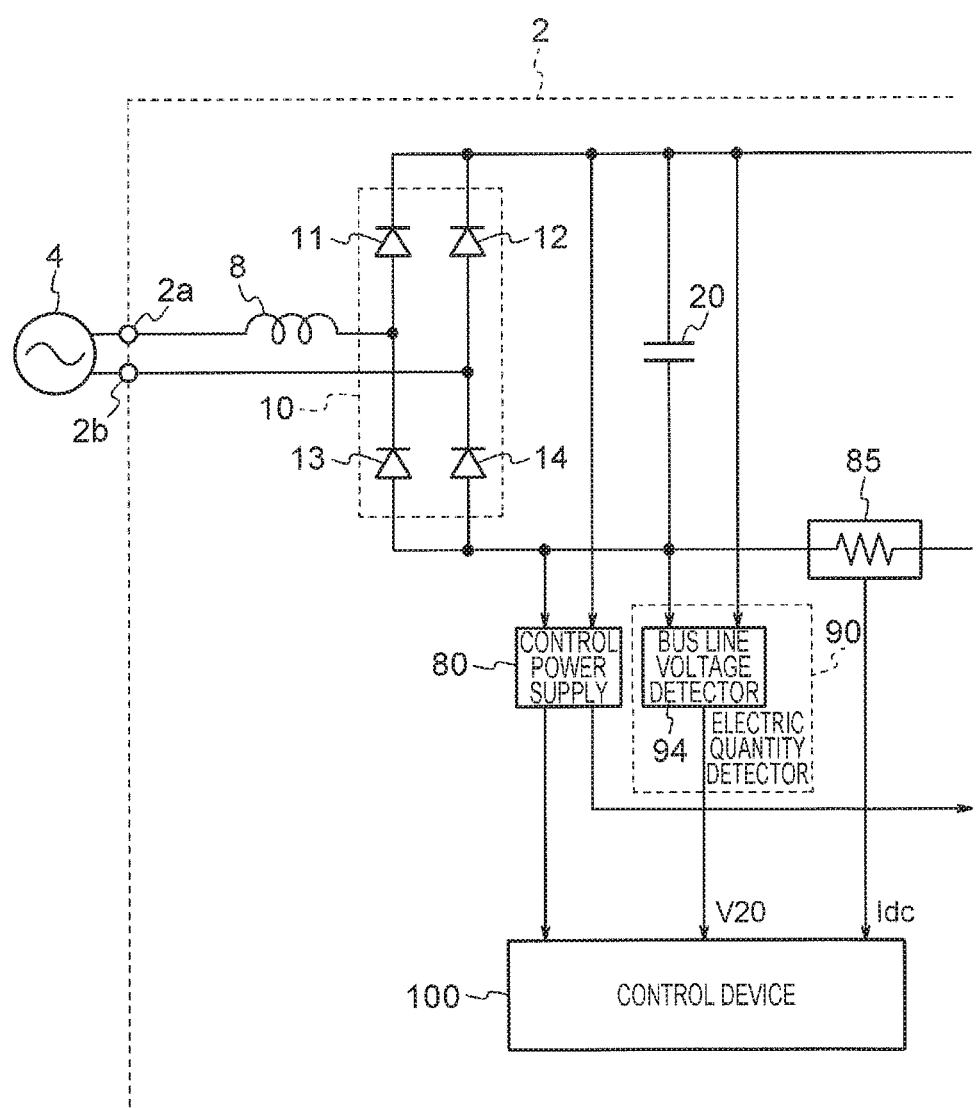
FIG. 12 is a diagram showing an electric quantity detector and parts connected thereto, in a motor driving apparatus of a second embodiment of the present invention.
Figure 13:
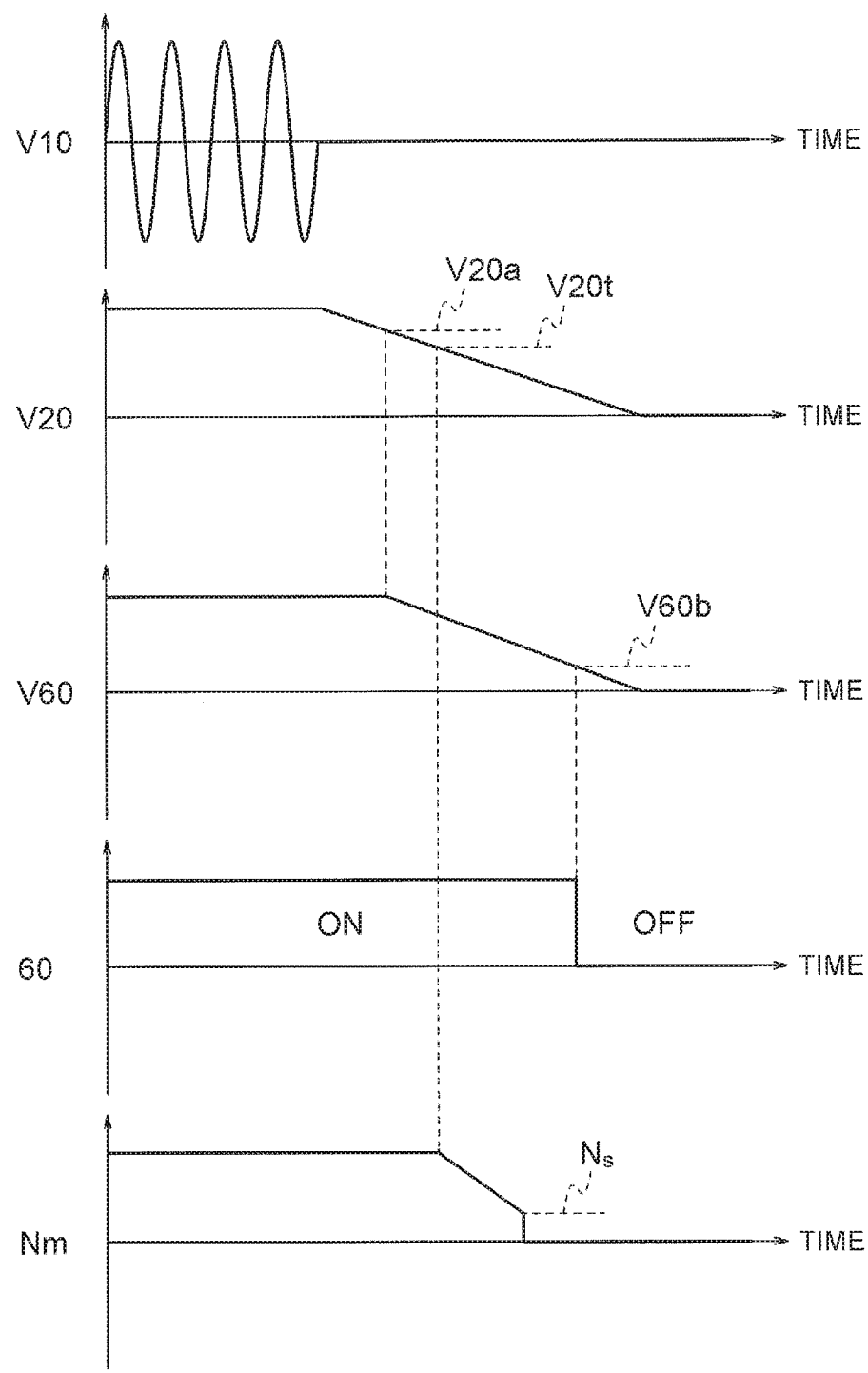
FIG. 13 is a waveform diagram showing the operation of the motor driving apparatus of the second embodiment.

FIG. 12 shows the electric quantity detector 90 and the parts which are connected to the electric quantity detector 90, of the motor driving apparatus 2 of the second embodiment. As shown in FIG. 12, the electric quantity detector 90 in the second embodiment includes a bus line voltage detector 94.

In the second embodiment, the bus line voltage V20 is detected, and the process of braking the motor 7 is performed based on the result of the detection.

The control power supply generating circuit 80 is supplied with power from the bus lines, to generate the switching power supply. Accordingly, if the bus line voltage V20 falls, the switching power supply voltage will also fall. Therefore, when the bus line voltage V20 falls below a decision threshold value V20t, a fall of the switching power supply voltage V60 is predicted. That is, it is predicted that the switching power supply voltage V60 will fall below the minimum voltage V60b in a short time.

The bus line voltage detector 94 detects the voltage V20 between the two electrodes of the capacitor 20, as the bus line voltage. For example, the bus line voltage detector 94 includes a circuit for dividing the bus line voltage V20 by means of a series-connected resistors, to produce a voltage, e.g., 5V or less, suitable for the processes in a microcomputer in the control device 100, and outputs the converted voltage. This signal (detection signal) is converted into a digital signal by an A/D converter, not shown, in the control device 100, and used for the processes within the control device 100.

The operation controller 102 (FIG. 7) receives the bus line voltage V20 as the electric quantity Qe from the electric quantity detector 90, and determines whether the bus line voltage V20 is not smaller than the decision threshold value V20t.

The operation of the second embodiment will now be described with reference to FIG. 13.

When the AC power supply 4 is lost, due, for example, to power failure, the bus line voltage V20 is gradually lowered, but the inverter 30 continues its operation using the charge stored in the capacitor 20.

When the bus line voltage V20 becomes lower than a certain value V20a, the switching power supply voltage V60 begins to fall.

The operation controller 102 repeatedly determines whether the bus line voltage V20 detected by the bus line voltage detector 94 is not smaller than the predetermined decision threshold value V20t, and when it determines that the bus line voltage V20 has fallen below the decision threshold value V20t, it predicts a fall of the switching power supply voltage V60 based on the result of the determination, and performs the process of braking the motor 7 based on this prediction.

The process of braking the motor 7 is identical to that in the first embodiment.

It is desirable that the decision threshold value V20t is so set as to be not larger than the smallest value of a range of variation of the bus line voltage V20 in a normal state, and larger than the bus line voltage V20 corresponding to the largest value of a range of variation of the smallest voltage (minimum voltage) V60b required for the operation of the connection switching device 60.

The variation of the bus line voltage V20 needs to be estimated by taking into consideration, such factors as variation due to voltage fluctuation of the AC power supply 4, and variation in the voltage drop in the wiring up to the input terminals 2a, 2b in a normal operation.

In the above description, the bus line voltage is detected, and a fall of the switching power supply voltage V60 is predicted based on the result of the detection. Alternatively, the bus line current or the bus line power may be detected, and a fall of the switching power supply voltage V60 may be predicted based on the result of the detection.

Third Embodiment

A third embodiment of the present invention will now be described with reference to FIG. 14, FIG. 15 and FIG. 16.

The motor driving apparatus 2 of the third embodiment is generally identical to that described with reference to FIG. 2 to FIG. 7 in connection with the first embodiment. The following description is centered on the differences.

Figure 14:
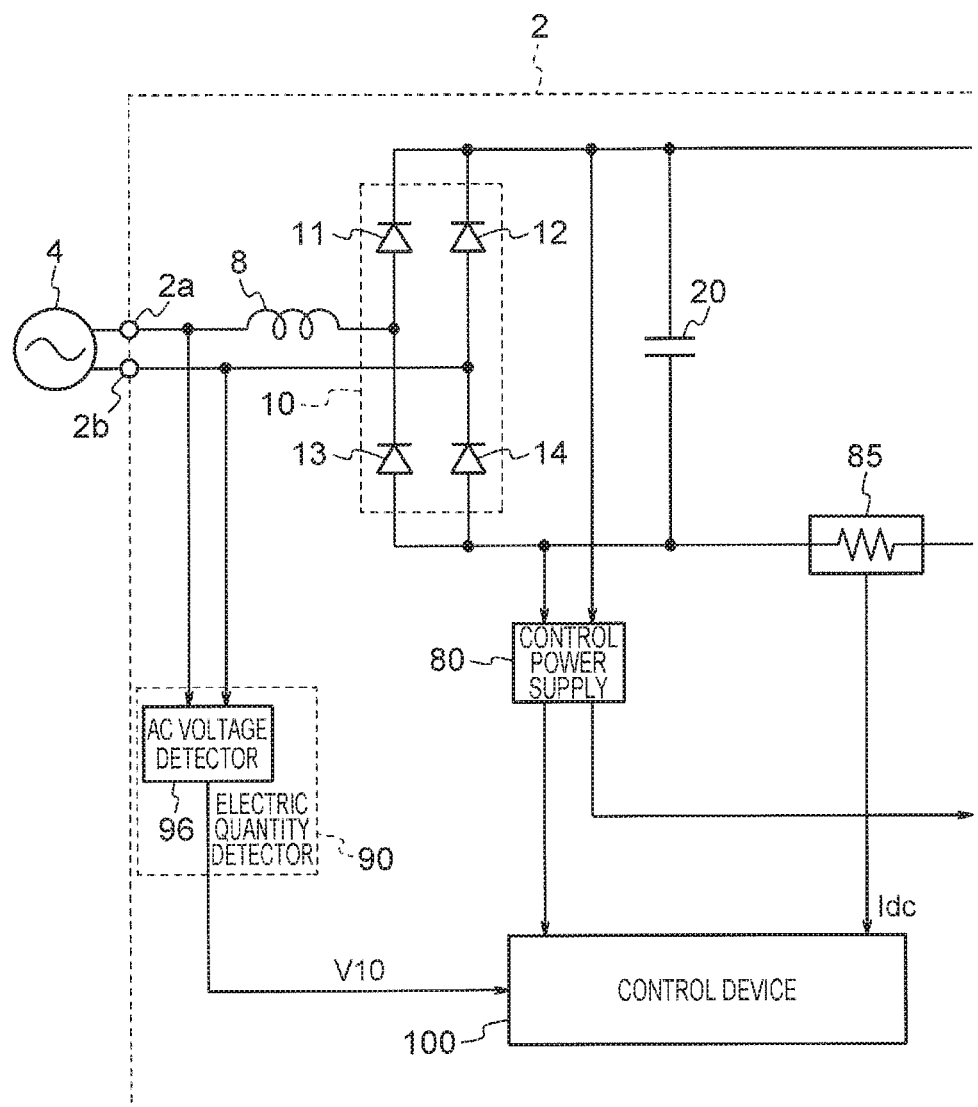
FIG. 14 is a diagram showing an electric quantity detector and parts connected thereto, in a motor driving apparatus of a third embodiment of the present invention.
Figure 15:
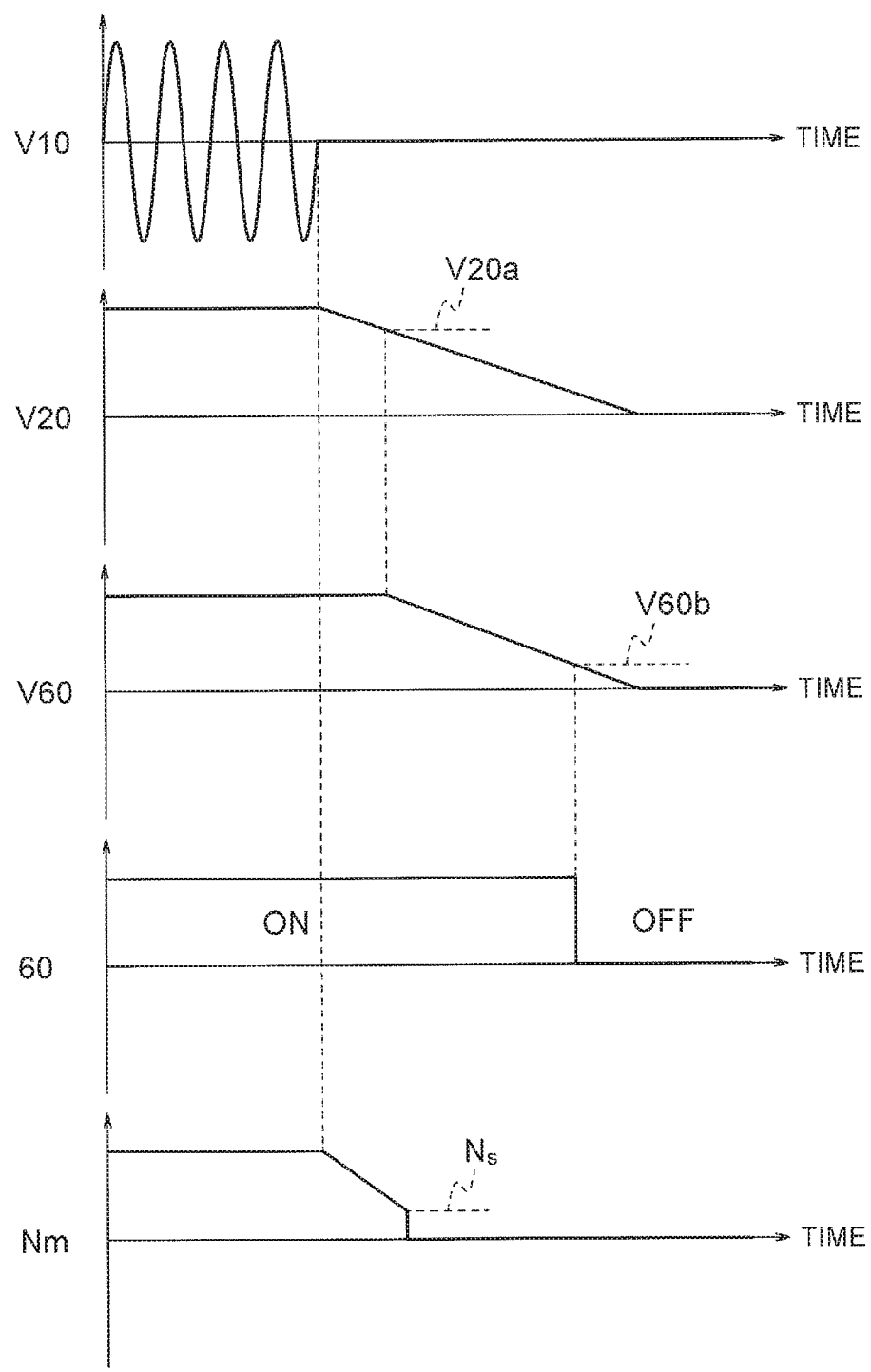
FIG. 15 is a waveform diagram showing the operation of the motor driving apparatus of the third embodiment.

FIG. 14 shows the electric quantity detector 90 and parts connected to the electric quantity detector 90, of the motor driving apparatus 2 of the third embodiment. As shown in FIG. 14, the electric quantity detector 90 in the third embodiment includes an AC voltage detector 96.

In the third embodiment, the AC voltage (input AC voltage) V10 applied to the input terminals 2a, 2b is monitored, and the process of braking the motor 7 is performed based on the result of the monitoring.

The control power supply generating circuit 80 generates the switching power supply from DC power obtained by rectifying, by means of the rectifying circuit 10, the AC power supplied via the input terminals 2a, 2b, so that if the AC power supply 4 is lost, the switching power supply voltage V60 falls. Accordingly, when the loss of the AC power supply 4 is detected, a fall of the switching power supply voltage V60 is predicted. That is, it is predicted that the switching power supply voltage V60 will fall below the minimum voltage V60b in a short time.

The AC voltage detector 96 detects, as the input AC voltage, the AC voltage V10 applied to the input terminals 2a, 2b. For example, the AC voltage detector 96 includes a circuit for dividing the input AC voltage V10 by means of series-connected resistors, to produce a voltage, e.g., 5V or less, suitable for processes by a microcomputer in the control device 100, and outputs the converted voltage. This signal (detection signal) is converted into a digital signal by an A/D converter, not shown, in the control device 100, and used for the processes within the control device 100.

The operation controller 102 (FIG. 7) receives the input AC voltage V10 from the AC voltage detector 96, as the electric quantity Qe from the electric quantity detector 90, and determines whether the AC power supply 4 is lost. The determination is performed based on whether a zero cross point is present in the input AC voltage.

The operation performed in a case in which the loss of the power supply is detected based on the disappearance of a zero cross point in the third embodiment will now be described with reference to FIG. 15.

When the AC power supply 4 is lost, due, for example, to power failure, the bus line voltage V20 is gradually lowered, but the inverter 30 continues its operation using the charge stored in the capacitor 20.

When the bus line voltage V20 becomes lower than a certain value V20a, the switching power supply voltage V60 begins to fall.

The operation controller 102 repeatedly determines whether the input AC voltage detected by the AC voltage detector 96 includes a zero cross point, and, when it finds that the zero cross point has ceased to appear, it determines, based on this finding, the AC power supply 4 has been lost, predicts a fall of the switching power supply voltage V60, and performs the process of braking the motor 7 based on the prediction.

The process of braking the motor 7 is identical to that in the first embodiment.

In the detection of the disappearance of the zero cross point, the following points should be taken into consideration. That is, even when the AC power supply 4 is lost, the instantaneous value of the input AC voltage may fluctuate due to noise or the like, and transition from positive to negative, or from negative to positive may occur. It is necessary that such fluctuation should not be determined to be a zero cross. Accordingly, it may be so arranged that fluctuation within a range of the order of ±few volts centered on the voltage value 0 should not be regarded as a change from positive to negative, or from negative to positive (i.e., a dead zone of the order of ±few volts may be provided).

For example, it may be so arranged that when the instantaneous value of the input AC voltage V10 transits from a state in which it is lower than a positive value (positive threshold value) to a state in which it is higher than the decision threshold value, then it is recognized that a change from negative to positive has occurred, and when the instantaneous value of the input AC voltage V10 transits from a state in which it is higher than a negative value (negative threshold value) to a state in which it is lower than the decision threshold value, then it is recognized that a change from positive to negative has occurred, and determination on the presence or absence of a zero cross point is made based on the recognition.

Also, where the frequency of the voltage of the AC power supply 4 is known, it may be so arranged that, until after the elapse of time corresponding to the frequency, from detection of a zero cross, the next zero cross is not recognized.

By such arrangement, immunity to noise can be improved.

Description has been made of a case in which, by detecting the disappearance of the zero cross point in the input AC voltage V10, the loss of the power supply is detected and a fall of the switching power supply voltage V60 is predicted. Alternatively, by detecting the decrease of the amplitude of the input AC voltage V10, the loss of the AC power supply 4 may be detected, and a fall of the switching power supply voltage V60 may be predicted.

Figure 16:
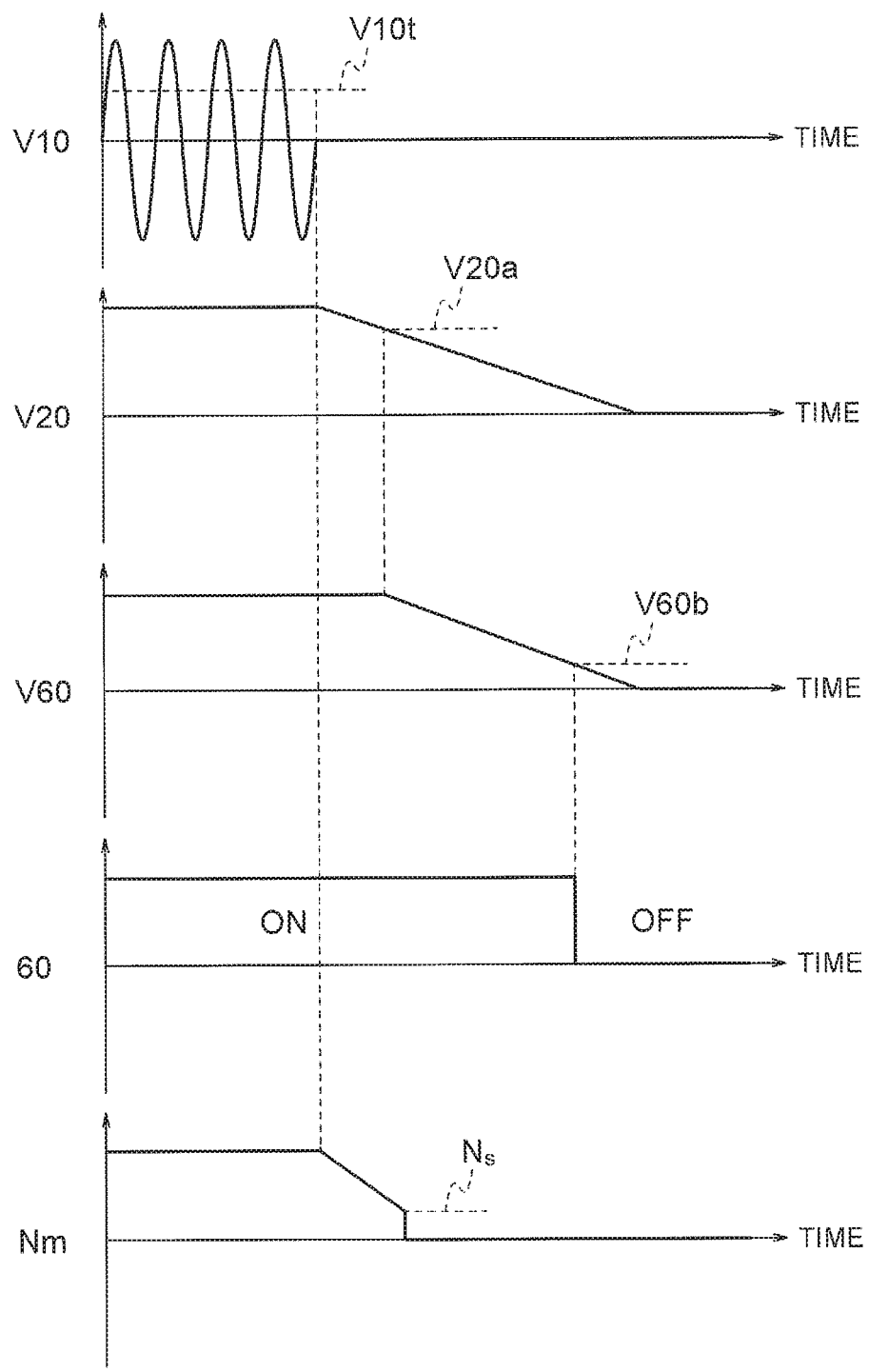
FIG. 16 is a waveform diagram showing the operation of a modification of the motor driving apparatus of the third embodiment.

In this case, for example, determination may be repeatedly made as to whether the amplitude of the input AC voltage V10 is not smaller than a decision threshold value V10t, as shown in FIG. 16, and when the amplitude becomes smaller than the decision threshold value V10t, it is determined that the power supply 4 has been lost, and a fall of the switching power supply voltage V60 is predicted.

It is desirable that the above-mentioned decision threshold value (absolute value) V10t is so set as to be not larger than the smallest value of a range of variation due to voltage fluctuation of the AC power supply 4 in a normal state, and larger than the input AC voltage V10 corresponding to the largest value of a range of variation of the smallest voltage (minimum voltage) V60b required for the operation of the connection switching device 60.

The variation of the input AC voltage V10 needs to be estimated taking into consideration such factors as variation due to voltage fluctuation of the AC power supply 4, and variation in the voltage drop in the wiring up to the input terminals 2a, 2b in a normal operation.

In the above description, the input AC voltage is detected, and a fall of the switching power supply voltage V60 is predicted based on the result of the detection. Alternatively, the input AC current or the input AC power may be detected, and a fall of the switching power supply voltage V60 may be predicted based on the result of the detection.

As has been described, the switching power supply voltage or current is detected in the first embodiment, the bus line voltage is detected in the second embodiment, the input AC voltage or the input AC current is detected in the third embodiment, the result of the detection is used for the detection or prediction of a fall of the switching power supply voltage, and the process of braking the motor 7 is performed based on the detection or prediction of the fall. However, it may be so arranged that two or more of the above mentioned switching power supply voltage, switching power supply current, bus line voltage, input AC voltage, and input AC current are detected, and the process of braking the motor 7 is performed based on the results of the detection. For example, if a fall of the switching power supply voltage V60 detected or predicted from one or more of the results of the detection, the process of braking the motor 7 may be performed.

What is essential is that the electric quantity detector 90 detects an electric quantity of the switching power supply, or at least one electric quantity which varies with the electric quantity of the switching power supply, and the operation controller 102 detects or predicts a fall of the voltage V60 of the switching power supply based on the result of the detection by the electric quantity detector 90, and performs the process of braking the motor 7 based on the result of the detection or prediction.

Here, the expression "to vary with" covers a situation in which a change in one electric quantity causes a change in another electric quantity, and a situation in which one electric quantity and another electric quantity are changed together due to a common cause.

In FIG. 2, as a current flowing through the inverter, the current flowing through a DC bus line is detected by the bus line current detector 85. However, the inverter current may be detected at a different position. That is, instead of the position illustrated in FIG. 2, the AC current flowing from the inverter 30 to the motor 7 may be detected. What is essential is that information on the current required for the control of the inverter by means of the control device 100 is obtained.

The bus line current detector 85 may be provided with means, such as an LPF (Low Pass Filter), for removing the effects of noise, in order to prevent erroneous detection due to external noise or the like. In such a case, it is desirable to set the time constant in such a range that does not interfere with the control of the motor 7 by means of the control device 100. For example, the time constant may be so set as to be equal to shorter than a period (control period) at which the control device 100 performs control over the motor 7, thereby avoiding interference with the control, while enabling removal of the effects of the noise.

Figure 17:
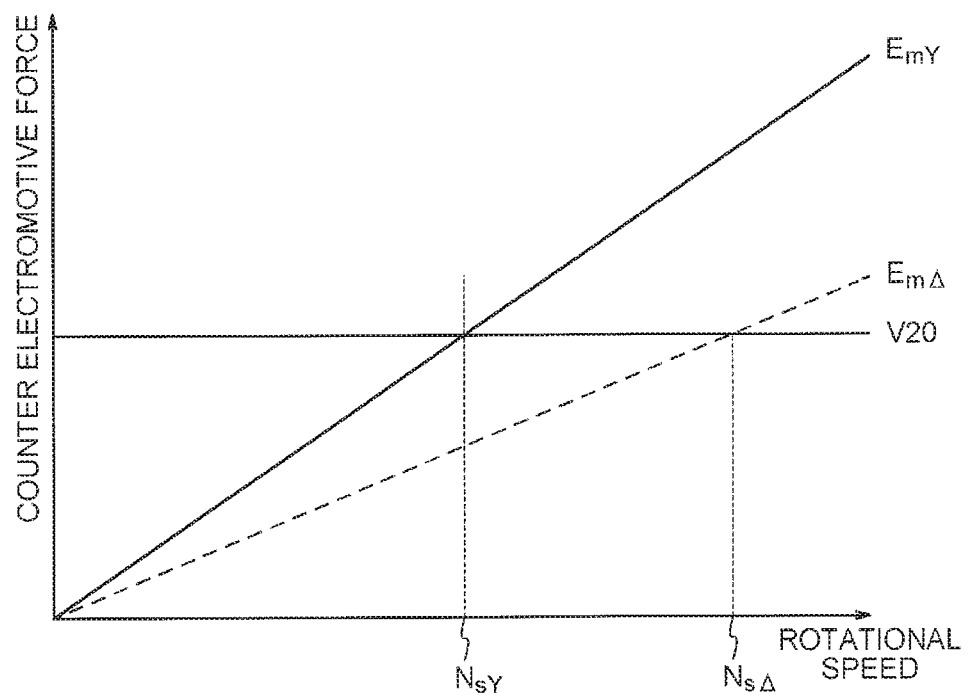
FIG. 17 is a diagram showing the relation between the rotational speed and the counter electromotive force of a motor.

In each of the first to third embodiments, it is so arranged that, before the switching of the connection switching device 60 due to the fall of the switching power supply voltage V60, the inverter 30 is stopped after the motor 7 is decelerated, and the rotational speed Nm becomes equal to or lower than the predetermined rotational speed Ns. The predetermined rotational speed Ns is determined based on the following consideration. That is, there is a difference, as shown in FIG. 17, in the counter electromotive force of the motor 7, between the connection states of the connection switching device 60. In FIG. 17, EmY denotes the counter electromotive force in the case of the Y connection, and EmΔ denotes the counter electromotive force in the case of the Δ connection.

That is, if the rotational speed is the same, the counter electromotive force is higher in the Y connection. Accordingly, in the case of Y connection, the motor 7 needs to be decelerated to a lower rotational speed, before the inverter 30 is stopped. This is because if the connection switching device 60 is switched while the counter electromotive force is higher than the bus line voltage V20, and a charge current to the capacitor 20 is flowing, a problem such as contact welding occurs.

In contrast, in the case of the Δ connection, no charge current to the capacitor 20 flows even if the inverter 30 is stopped at a rotational speed higher than in the Y connection.

For this reason, the rotational speed (the above-mentioned "predetermined rotational speed") Ns at which the inverter 30 is stopped may be set to different values between the Y connection and the Δ connection.

For example, if it is assumed that the manner in which the bus line voltage V20 is lowered with the elapse of time after the loss of the power supply is the same between the case of the Y connection and the case of the Δ connection, the rotational speed NsA at which the inverter 30 is stopped in the case of the A connection can be set to a value higher than the rotational speed NsY at which the inverter 30 is stopped in the case of the Y connection. By such arrangement, the inverter 30 can be stopped sooner in the Δ connection, charging of the capacitor 20 due to the counter electromotive force can be prevented, and a motor driving apparatus with a higher reliability can be realized.

However, even in a state in which the counter electromotive force is small because of the Δ connection, when the switching power supply falls, the connection switching device 60 is switched to the "b" contact side, and hence from the Δ connection to the Y connection, then the voltage value is increased (becomes √3 times) as shown in FIG. 17. As a result of the switching to the Y connection, the counter electromotive force is abruptly increased. Accordingly, a large charge current may flow at the time of the switching, causing arc discharge.

In order to prevent such an event, it is desirable from the viewpoint of protection of the connection switching device, that the connection switching device is of such a configuration in which it is in the Δ connection after the switching due to the fall of the switching power supply voltage (the connection switching device 60 is in the Y connection when it is ON, and in the Δ connection when it is OFF). This is because, by such arrangement, the fall of the switching power supply voltage will cause switching from the Y connection to the Δ connection, and the counter electromotive force after the switching becomes lower.

As the rectifying elements 11 to 14 of the rectifying circuit 10, diodes or the like are commonly used. However, MOSFETs (metal-oxide-semiconductor field-effect-transistors) or the like may be used, and turned ON in accordance with the polarity of the voltage (input AC voltage) supplied from the AC power supply 4, to achieve the rectification.

As the switching elements 311 to 316 in the inverter main circuit 310, IGBTs (Insulated Gate Bipolar Transistors) or MOSFETs are envisaged. However, this does not impose any restriction on the present invention, and any elements capable of switching may be used. Incidentally, MOSFETs are structurally associated with parasitic diodes so that the free-wheeling rectifying elements (321 to 326) need not be connected in parallel, and yet similar results can be obtained.

The material of the rectifying elements 11 to 14 and the switching elements 311 to 316 is not limited to silicon (Si), but may be wide-band gap semiconductor, such as silicon carbide (Sic), gallium nitride (GaN), diamond. By using such a material, the power loss can be reduced.

Fourth Embodiment

In the configuration shown in FIG. 2, each selector in the connection switching device 60 is formed of a selection switch. Alternatively, each selector may be formed of a combination of a normally-closed switch and a normally-open switch. An example of a connection switching device in such a case is shown in FIG. 18.

Figure 18:
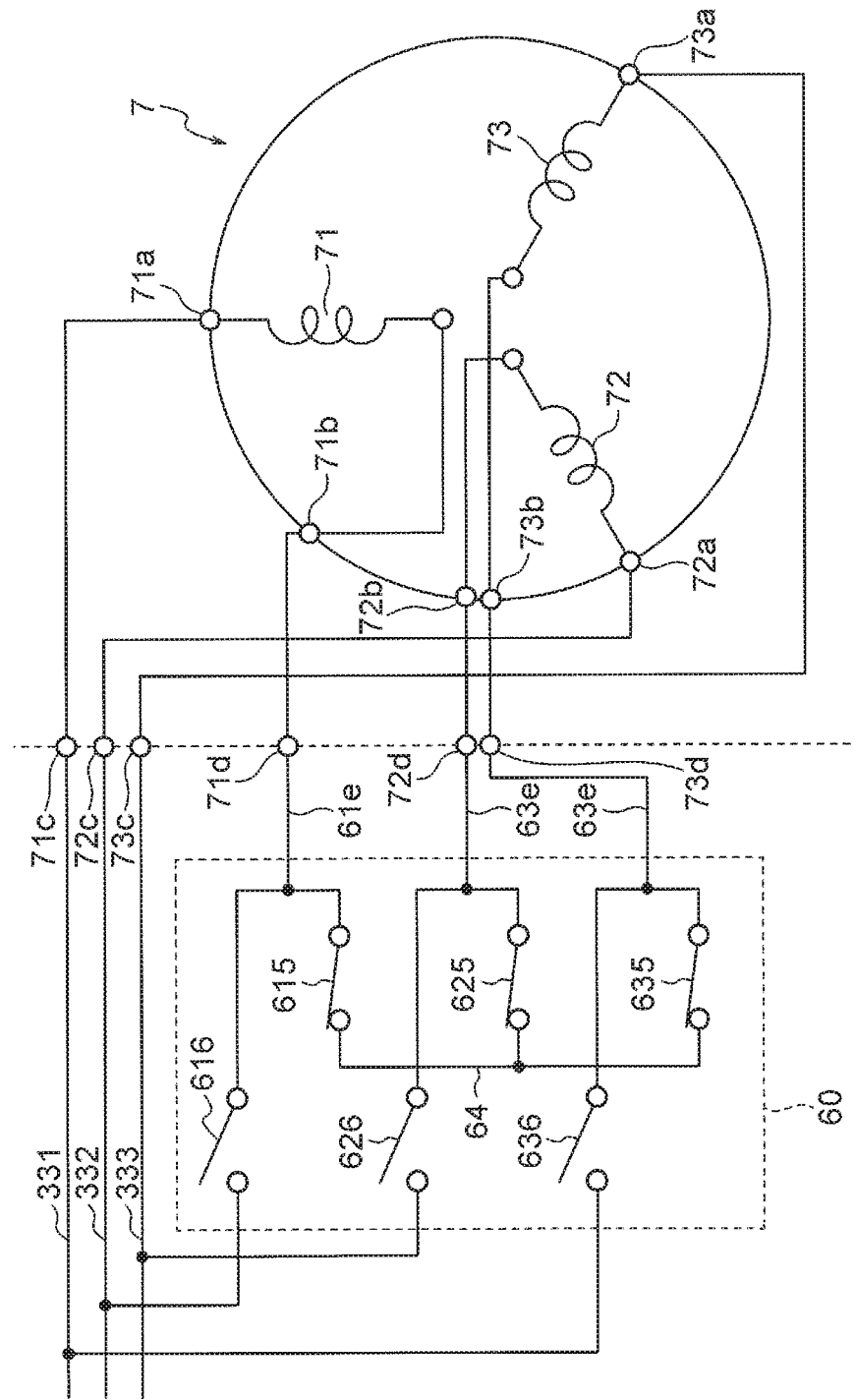
FIG. 18 is a wiring diagram showing windings of a motor and a connection switching device in a fourth embodiment of the present invention.

In the configuration shown in FIG. 18, the selection switch of the selector 61 is replaced with a combination of a normally-closed switch 615 and a normally-open switch 616, the selection switch of the selector 62 is replaced with a combination of a normally-closed switch 625 and a normally-open switch 626, and the selection switch of the selector 63 is replaced with a combination of a normally-closed switch 635 and a normally-open switch 636.

In the illustrated state in which the normally-closed switches 615, 625, 635 are closed (are on), and the normally-open switches 616, 626, 636 are open (are off), the motor is Y-connected. In a state opposite to the illustrated state, in which the normally-closed switches 615, 625, 635 are open, and the normally-open switches 616, 626, 636 are closed, the motor is A-connected.

Even in a case in which each selector is formed of a combination of a normally-closed switch and a normally-open switch as shown in FIG. 18, an electromagnetic switch can be used as each switch. Electromagnetic switches are advantageous in that the on-time conduction loss is small.

In a case in which each selector is formed of a combination of a normally-closed switch and a normally-open switch as shown in FIG. 18, a semiconductor switch formed of a wide-band gap semiconductor (WBG semiconductor) such as silicon carbide (SiC), gallium nitride (GaN), gallium oxide (Ga2O3), diamond or the like, may be used. Such a semiconductor switch has a small on-resistance, a low loss and a small element heat generation. In addition, such a semiconductor switch is capable of high-speed switching.

Even where a semiconductor switch is used, when the switching power supply voltage falls, switching may occur for the following reason.

That is, on-off of a semiconductor switch is controlled by a signal input to a control terminal, and the switching power supply for a connection switching device having semiconductor switches is the power supply for the signals input to the control terminals of the semiconductor switches.

If the voltage of the power supply for the signals input to the control terminals of the semiconductor switches is lowered, and falls below the minimum voltage required for maintaining the operative state, the semiconductor switches may become in the non-operative state (OFF state), and switching may occur. That is, semiconductor switches (normally-off type switches) which are in the ON state when the control terminals are High may become OFF, and semiconductor switches (normally-on type switches) which are in the OFF state when the control terminals are High may become ON. When such switching takes place, the elements may be damaged by a surge voltage.

Accordingly, as in the case in which electromagnetic switches are used, it is desirable to control the inverter such that the rotational speed of the motor 7 becomes sufficiently low, before the switching power supply voltage V60 falls below the minimum voltage required for the operation of the connection switching device 60 (the minimum voltage required for maintaining the semiconductor switches in the operative state).

Fifth Embodiment

In the first to fourth embodiments, the present invention is applied to a motor having stator windings which can be switched between a Y connection and a Δ connection.

The present invention can be applied to cases in which the connection is switched in other ways.

For instance, the present invention can be applied to a motor in which the winding of each phase consists of two or more winding portions, and can be switched between a parallel connection and a series connection.

In this case, both ends of each of the two or more winding portions constituting the winding of each phase are made to be connectable to the outside of the motor, and the connection state is switched by a connection switching device 60.

Figure 19:
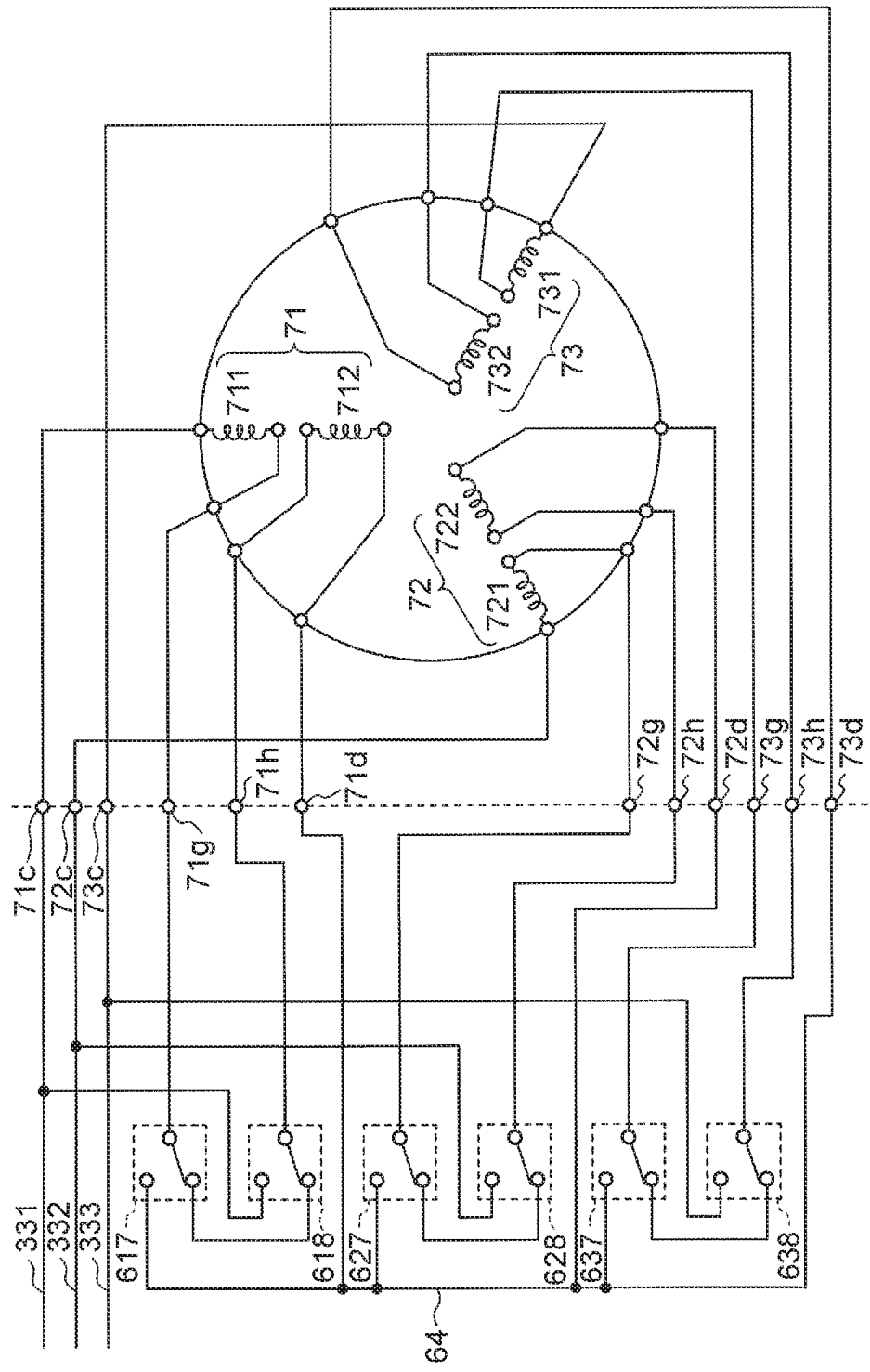
FIG. 19 is a wiring diagram showing windings of a motor and a connection switching device in a fifth embodiment of the present invention.

FIG. 19 shows a configuration in which the winding of each phase of a Y-connected motor consists of two winding portions, both ends of each winding portion are connectable to the outside of the motor 7, and the connection state is switched by a connection switching device 60.

Specifically, the U-phase winding 71 consists of two winding portions 711, 712, the V-phase winding 72 consists of two winding portions 721, 722, and the W-phase winding 73 consists of two winding portions 731, 732.

First ends of the winding portions 711, 721, 731 are connected via external terminals 71*c*, 72*c*, 73*c* to the output lines 331, 332, 333 of the inverter 30.

Second ends of the winding portions 711, 721, 731 are connected via external terminals 71*g*, 72*g*, 73*g* to common contacts of selection switches 617, 627, 627.

First ends of the winding portions 712, 722, 732 are connected via external terminals 71*h*, 72*h*, 73*h* to common contacts of selection switches 618, 628, 638.

Second ends of the winding portions 712, 722, 732 are connected via external terminals 71*d*, 72*d*, 73*d* to a neutral point node 64.

Normally-closed contacts of the selection switches 617, 627, 637 are connected to normally-closed contacts the selection switches 618, 628, 638.

Normally-open contacts of the selection switches 617, 627, 637 are connected to the neutral point node 64.

Normally-open contacts of the selection switches 618, 628, 638 are connected to the output lines 331, 332, 333 of the inverter 30.

The selection switches 617, 627, 637, 618, 628, 638 in combination form the connection switching device 60.

Even in a case in which the above-mentioned connection switching device is used, protection of the connection switching device 60 can be made in a manner similar to those described in the first to third embodiments.

In the configuration shown in FIG. 19, in a state in which the selection switches 617, 627, 637, 618, 628, 638 are switched to the normally-closed contact side as illustrated, the motor is in a series connection state, and in a state in which the selection switches 617, 627, 637, 618, 628, 638 are switched to the normally-open contact side, opposite to that illustrated, the motor is in a parallel connection state. If the rotational speed is the same, the counter electromotive force in the series connection state is twice the counter electromotive force in the parallel connection state.

If it is assumed that the manner in which the bus line voltage V20 is lowered with the elapse of time after the loss of the power supply is the same between the case of the series connection and the case of the parallel connection, the rotational speed (predetermined rotational speed) Ns at which the inverter 30 is stopped in the case of the series connection is set to a value lower than, e.g., ½ the rotational speed at which the inverter 30 is stopped in the case of the parallel connection.

Incidentally, also in the fifth embodiment, combinations of a normally-closed switch and a normally-open switch may be used in place of the selection switches, as described in the fourth embodiment.

Description has been made of a case in which a Y-connected motor is switched between a series connection state and a parallel connection state. The present invention is equally applicable to a case in which a Δ-connected motor is switched between a series connection state and a parallel connection state.

Description has been made on the configurations in which the winding of each phase of Y connection or Δ connection is switched between a series connection and a parallel connection. However, the present invention is applicable to configurations in which an intermediate tap is provided on each winding in the state of Y connection or Δ connection, and part of the winding is short-circuited by a switch, to change the voltage required for the drive.

In summary, the present invention is applicable to cases where the connection state of the windings of the motor can be switched, and the switching causes the counter electromotive force to be changed.

The configurations shown in the embodiments described above are examples of the configurations according to the present invention, and may be combined with known techniques, and various modifications, including omission of part of the configuration, may be made without departing from the spirit of the present invention.

INDUSTRIAL APPLICABILITY

As has been described, the present invention is suitable for a motor driving apparatus with which the windings are switched in the use of the motor 7, and refrigeration cycle equipment provided with such a motor driving apparatus.

An air conditioner was raised as an example of the refrigeration cycle equipment, but this does not impose any restriction on the present invention, and the present invention is applicable, for example, to a refrigerator, a freezer, a heat pump water heater, and the like.

The invention claimed is:

1. A motor driving apparatus to drive a motor having windings whose connection state can be switched, said motor driving apparatus, comprising:
   a connection switching device to switch the connection state;
   a control power supply generating circuit to provide a switching power supply to the connection switching device;
   an inverter to apply an AC voltage of a variable frequency and a variable voltage value to the motor;
   a control device to control the inverter and the connection switching device; and
   an electric quantity detector to detect a first electric quantity of the switching power supply, or at least one second electric quantity which varies with the first electric quantity;
   wherein, before a fall of a voltage of the switching power supply below a minimum voltage required for operation of the connection switching device, the motor is stopped.

2. The motor driving apparatus as set forth in claim 1, wherein said at least one second electric quantity detected by the electric quantity detector comprises a DC voltage input to the inverter, and when the DC voltage becomes lower than a threshold value, the motor is stopped before the fall below the minimum voltage required for the operation of the connection switching device.

3. The motor driving apparatus as set forth in claim 1, wherein said at least one second electric quantity detected by the electric quantity detector comprises an AC voltage applied to the motor driving apparatus, and when the AC voltage ceases to include a zero cross point, the motor is stopped before the fall below the minimum voltage required for the operation of the connection switching device.

4. The motor driving apparatus as set forth in claim 1, wherein said at least one second electric quantity detected by the electric quantity detector comprises an AC voltage applied to the motor driving apparatus, and when the amplitude of the AC voltage becomes smaller than a threshold value, the motor is stopped before the fall below the minimum voltage required for the operation of the connection switching device.

5. The motor driving apparatus as set forth in claim 1, wherein said first electric quantity detected by the electric quantity detector includes the voltage of the switching power supply, and when the voltage becomes lower than a threshold value, the motor is stopped before the fall below the minimum voltage required for the operation of the connection switching device.

6. The motor driving apparatus as set forth in claim 1, wherein
the connection switching device comprises an electromagnetic switch having an excitation coil and a contact driven by a current flowing through the excitation coil, and
the switching power supply is a power supply to cause the current to flow through the excitation coil.

7. The motor driving apparatus as set forth in claim 1, wherein
the connection switching device comprises a semiconductor switch controlled by a signal input to a control terminal, and
the switching power supply is a power supply for the signal input to the control terminal.

8. The motor driving apparatus as set forth in claim 7, wherein the semiconductor switch is formed of a wide-band gap semiconductor.

9. The motor driving apparatus as set forth in claim 1, wherein
if the rotational speed of the motor is equal to or smaller than a predetermined rotational speed when the fall of the voltage of the switching power supply is detected or predicted, the control device causes the inverter to be stopped promptly, and
if the rotational speed of the motor is higher than the predetermined rotational speed when the fall of the voltage of the switching power supply is detected or predicted, the control device causes the rotational speed of the motor to be decreased gradually, and causes the inverter to be stopped after the rotational speed of the motor becomes lower than the predetermined rotational speed.

10. The motor driving apparatus as set forth in claim 9, wherein the predetermined rotational speed is set to different values depending on the connection state.

11. The motor driving apparatus as set forth in claim 10, wherein
the motor has a configuration in which switching between a star connection and a delta connection can be made, and
the predetermined rotational speed for the delta connection is higher than the predetermined rotational speed for the star connection.

12. A refrigeration cycle equipment comprising the motor driving apparatus as set forth in claim 1.

* * * * *